US012389180B2

(12) United States Patent
Chamness et al.

(10) Patent No.: US 12,389,180 B2
(45) **Date of Patent: *Aug. 12, 2025**

(54) MANIPULATION OF PLAYBACK DEVICE RESPONSE USING SIGNAL PROCESSING

(71) Applicant: Sonos, Inc., Santa Barbara, CA (US)

(72) Inventors: Mike Chamness, Gloucester, MA (US); Romi Kadri, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,902

(22) Filed: Apr. 23, 2024

(65) Prior Publication Data

US 2025/0016516 A1 Jan. 9, 2025

Related U.S. Application Data

(63) Continuation of application No. 18/063,898, filed on Dec. 9, 2022, now Pat. No. 11,974,114, which is a (Continued)

(51) Int. Cl.
*H04S 5/00* (2006.01)
*H04R 1/32* (2006.01)

(Continued)

(52) U.S. Cl.
CPC ............... *H04S 5/005* (2013.01); *H04R 3/12* (2013.01); *H04R 5/02* (2013.01); *H04S 3/02* (2013.01);

(Continued)

(58) Field of Classification Search
CPC . H04S 5/005; H04S 7/307; H04S 7/30; H04S 3/02; H04S 2400/13;

(Continued)

(56) References Cited

U.S. PATENT DOCUMENTS 4,509,184 A 4/1985 Yanagawa
4,995,778 A 2/1991 Bruessel (Continued)

FOREIGN PATENT DOCUMENTS

EP 1133896 B1 8/2002
EP 1360874 A2 11/2003

(Continued)

OTHER PUBLICATIONS

AudioTron Quick Start Guide, Version 1.0, Mar. 2001, 24 pages.

(Continued)

*Primary Examiner* — Muhammad N Edun
(74) *Attorney, Agent, or Firm* — FORTEM IP LLP

(57) ABSTRACT

Example techniques involve outputting multiple audio channels using a multiple driver playback device. An example playback device receives a first and second channel of audio content. The playback device plays back play back the first channel via a first group of audio transducers such that the first group of audio transducers form, via superposition, a first response lobe having a maximum in a first direction. Further, the playback device plays back the second channel via a second group of audio transducers such that the second group of audio transducers form, via superposition, a second response lobe having a maximum in a second direction that is separated by an angle of at least 45° from the first direction.

20 Claims, 13 Drawing Sheets

Related U.S. Application Data continuation of application No. 17/547,852, filed on Dec. 10, 2021, now Pat. No. 11,528,573, which is a continuation of application No. 17/001,434, filed on Aug. 24, 2020, now Pat. No. 11,202,160, which is a continuation of application No. 16/544,051, filed on Aug. 19, 2019, now Pat. No. 10,812,922, which is a continuation of application No. 16/205,447, filed on Nov. 30, 2018, now Pat. No. 10,433,092, which is a continuation of application No. 16/042,775, filed on Jul. 23, 2018, now Pat. No. 10,149,085, which is a continuation of application No. 15/676,787, filed on Aug. 14, 2017, now Pat. No. 10,034,115, which is a continuation of application No. 14/831,910, filed on Aug. 21, 2015, now Pat. No. 9,736,610.

(51) Int. Cl.
*H04R 3/12* (2006.01)
*H04R 5/02* (2006.01)
*H04S 3/02* (2006.01)
*H04S 7/00* (2006.01)

(52) U.S. Cl.
CPC ................ *H04S 7/30* (2013.01); *H04S 7/307* (2013.01); *H04R 1/323* (2013.01); *H04S 5/00* (2013.01); *H04S 7/305* (2013.01); *H04S 2400/05* (2013.01); *H04S 2400/13* (2013.01)

(58) Field of Classification Search
CPC ........ H04S 2400/05; H04S 7/305; H04S 5/00; H04R 3/12; H04R 5/02; H04R 1/323
See application file for complete search history.

(56) References Cited

U.S. PATENT DOCUMENTS 5,440,644 A 8/1995 Farinelli et al.
5,610,986 A 3/1997 Miles
5,761,320 A 6/1998 Farinelli et al.
5,809,153 A 9/1998 Aylward et al.
5,910,991 A 6/1999 Farrar
5,923,902 A 7/1999 Inagaki
6,032,202 A 2/2000 Lea et al.
6,118,876 A 9/2000 Ruzicka
6,256,554 B1 7/2001 DiLorenzo
6,404,811 B1 6/2002 Cvetko et al.
6,469,633 B1 10/2002 Wachter
6,522,886 B1 2/2003 Youngs et al.
6,611,537 B1 8/2003 Edens et al.
6,631,410 B1 10/2003 Kowalski et al.
6,757,517 B2 6/2004 Chang
6,778,869 B2 8/2004 Champion
7,072,477 B1 7/2006 Kincaid
7,130,608 B2 10/2006 Hollstrom et al.
7,130,616 B2 10/2006 Janik
7,143,939 B2 12/2006 Henzerling
7,236,773 B2 6/2007 Thomas
7,295,548 B2 11/2007 Blank et al.
7,391,791 B2 6/2008 Balassanian et al.
7,483,538 B2 1/2009 McCarty et al.
7,490,044 B2 2/2009 Kulkarni
7,519,188 B2 4/2009 Berardi et al.
7,571,014 B1 8/2009 Lambourne et al.
7,630,500 B1 12/2009 Beckman et al.
7,630,501 B2 12/2009 Blank et al.
7,643,894 B2 1/2010 Braithwaite et al.
7,657,910 B1 2/2010 McAulay et al.
7,853,341 B2 12/2010 McCarty et al.
7,987,294 B2 7/2011 Bryce et al.
8,014,423 B2 9/2011 Thaler et al.
8,045,952 B2 10/2011 Qureshey et al.
8,063,698 B2 11/2011 Howard
8,103,009 B2 1/2012 McCarty et al.
8,139,774 B2 3/2012 Berardi et al.
8,160,281 B2 4/2012 Kim et al.
8,175,292 B2 5/2012 Aylward et al.
8,229,125 B2 7/2012 Short
8,233,632 B1 7/2012 MacDonald et al.
8,234,395 B2 7/2012 Millington
8,238,578 B2 8/2012 Aylward
8,243,961 B1 8/2012 Morrill
8,265,310 B2 9/2012 Berardi et al.
8,290,185 B2 10/2012 Kim
8,306,235 B2 11/2012 Mahowald
8,325,935 B2 12/2012 Rutschman
8,331,585 B2 12/2012 Hagen et al.
8,391,501 B2 3/2013 Khawand et al.
8,452,020 B2 5/2013 Gregg et al.
8,483,853 B1 7/2013 Lambourne
8,577,045 B2 11/2013 Gibbs
8,600,075 B2 12/2013 Lim
8,620,006 B2 12/2013 Berardi et al.
8,855,319 B2 10/2014 Liu et al.
8,879,761 B2 11/2014 Johnson et al.
8,914,559 B2 12/2014 Kalayjian et al.
8,934,647 B2 1/2015 Joyce et al.
8,934,655 B2 1/2015 Breen et al.
8,942,252 B2 1/2015 Balassanian et al.
8,965,546 B2 2/2015 Msser et al.
8,977,974 B2 3/2015 Kraut
8,984,442 B2 3/2015 Pirnack et al.
9,020,153 B2 4/2015 Britt, Jr.
2001/0042107 A1 11/2001 Palm
2002/0022453 A1 2/2002 Balog et al.
2002/0026442 A1 2/2002 Lipscomb et al.
2002/0124097 A1 9/2002 Isely et al.
2003/0157951 A1 8/2003 Hasty, Jr.
2004/0024478 A1 2/2004 Hans et al.
2004/0105559 A1 6/2004 Aylward et al.
2007/0142944 A1 6/2007 Goldberg et al.
2008/0273712 A1 11/2008 Eichfeld et al.
2009/0228897 A1 9/2009 Murray et al.
2010/0142735 A1 6/2010 Yoon et al.
2011/0170710 A1 7/2011 Son
2011/0216926 A1 9/2011 Riggs et al.
2011/0316996 A1 12/2011 Abe et al.
2012/0051558 A1 3/2012 Kim et al.
2012/0127831 A1 5/2012 Gicklhorn et al.
2012/0263325 A1 10/2012 Freeman et al.
2013/0010970 A1 1/2013 Hegarty et al.
2013/0028443 A1 1/2013 Pance et al.
2013/0173034 A1 7/2013 Reimann et al.
2013/0259254 A1 10/2013 Xiang et al.
2013/0287228 A1 10/2013 Kallai et al.
2014/0016784 A1 1/2014 Sen et al.
2014/0016786 A1 1/2014 Sen
2014/0016802 A1 1/2014 Sen
2014/0023196 A1 1/2014 Xiang et al.
2014/0079256 A1 3/2014 De Muynke et al.
2014/0112481 A1 4/2014 Li et al.
2014/0219456 A1 8/2014 Morrell et al.
2014/0226823 A1 8/2014 Sen et al.
2014/0294200 A1 10/2014 Baumgarte et al.
2014/0355768 A1 12/2014 Sen et al.
2014/0355773 A1 12/2014 North
2014/0355794 A1 12/2014 Morrell et al.
2015/0063610 A1 3/2015 Mossner
2015/0146886 A1 5/2015 Baumgarte
2015/0201274 A1 7/2015 Ellner et al.
2015/0281866 A1 10/2015 Williams et al.
2015/0286360 A1 10/2015 Wachter

FOREIGN PATENT DOCUMENTS

EP 1389853 A1 2/2004
EP 1825713 B1 10/2012
EP 2860992 A1 4/2015
WO 200153994 7/2001
WO 02065815 A2 8/2002

(56) References Cited

FOREIGN PATENT DOCUMENTS

| | | |
|---|---|---|
| WO | 2003093950 A2 | 11/2003 |
| WO | 2015024881 A1 | 2/2015 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Co-pending U.S. Application No. 202016544051, inventors Chamness; Mike et al., filed on Aug. 19, 2019.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Examination Report mailed on Jun. 19, 2018, issued in connection with European Application No. 167781293, 6 pages.
European Patent Office, European Extended Search Report mailed on Mar. 16, 2020, issued in connection with European Application No. 19208359.0, 7 pages.
European Patent Office, European Extended Search Report mailed on May 23, 2022, issued in connection with European Application No. 21199246.6, 7 pages.
European Patent Office, Summons to Attend Oral Proceedings mailed on Dec. 3, 2018, issued in connection with European Application No. 16778129.3, 8 pages.
Final Office Action mailed on Jun. 10, 2021, issued in connection with U.S. Appl. No. 17/001,434, filed Aug. 24, 2020, 10 pages.
Final Office Action mailed on Sep. 21, 2023, issued in connection with U.S. Appl. No. 18/063,898, filed Dec. 9, 2022, 12 pages.
International Bureau, International Preliminary Report on Patentability and Written Opinion, mailed on Feb. 27, 2018, issued in connection with International Application No. PCT/US2016/047418, filed on Aug. 17, 2016, 7 pages.
International Bureau, International Search Report and Written Opinion mailed on May 10, 2022, issued in connection with International Application No. PCT/US2022/070235, filed on Jan. 18, 2022, 13 pages.
International Searching Authority, International Search Report and Written Opinion mailed on Dec. 21, 2016, issued in connection with International Application No. PCT/US2016/047418 filed on Aug. 17, 2016, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jot et al., "Spatial Enhancement of Audio Recordings", 15th International Conference: Audio, Acoustics Small Spaces, Audio Engineering Society, 2003, 11 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed Dec. 17, 2020, issued in connection with U.S. Appl. No. 17/001,434, filed Aug. 24, 2020, 15 pages.
Non-Final Office Action mailed on Nov. 14, 2017, issued in connection with U.S. Appl. No. 15/676,787, filed Aug. 14, 2017, 9 pages.
Non-Final Office Action mailed on Jul. 18, 2022, issued in connection with U.S. Appl. No. 17/547,852, filed Dec. 10, 2021, 13 pages.
Non-Final Office Action mailed on Feb. 21, 2020, issued in connection with U.S. Appl. No. 16/544,051, filed Aug. 19, 2019, 11 pages.
Non-Final Office Action mailed on Jan. 22, 2019, issued in connection with U.S. Appl. No. 16/205,447, filed Nov. 30, 2018, 10 pages.
Non-Final Office Action mailed on Apr. 7, 2023, issued in connection with U.S. Appl. No. 18/063,898, filed Dec. 9, 2022, 19 pages.
Notice of Allowance mailed on May 1, 2017, issued in connection with U.S. Appl. No. 14/831,910, filed Aug. 21, 2015, 11 pages.
Notice of Allowance mailed on Dec. 12, 2023, issued in connection with U.S. Appl. No. 18/063,898, filed Dec. 9, 2022, 6 pages.
Notice of Allowance mailed on May 17, 2019, issued in connection with U.S. Appl. No. 16/205,447, filed Nov. 30, 2018, 5 pages.
Notice of Allowance mailed on Aug. 18, 2021, issued in connection with U.S. Appl. No. 17/001,434, filed Aug. 24, 2020, 5 pages.
Notice of Allowance mailed on Oct. 21, 2022, issued in connection with U.S. Appl. No. 17/547,852, filed Dec. 10, 2021, 5 pages.
Notice of Allowance mailed on Jun. 22, 2017, issued in connection with U.S. Appl. No. 14/831,910, filed Aug. 21, 2015, 5 pages.
Notice of Allowance mailed on Mar. 22, 2019, issued in connection with U.S. Appl. No. 16/205,447, filed Nov. 30, 2018, 7 pages.
Notice of Allowance mailed on Mar. 23, 2018, issued in connection with U.S. Appl. No. 15/676,787, filed Aug. 14, 2017, 5 pages.
Notice of Allowance mailed on May 26, 2020, issued in connection with U.S. Appl. No. 16/544,051, filed Aug. 19, 2019, 5 pages.
Notice of Allowance mailed on Sep. 7, 2018, issued in connection with U.S. Appl. No. 16/042,775, filed Jul. 23, 2018, 12 pages.
Palm, Inc., "Handbook for the Palm VII Handheld," May 2000, 311 pages.
Preinterview First Office Action mailed on Feb. 23, 2017, issued in connection with U.S. Appl. No. 14/831,910, filed Aug. 21, 2015, 5 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

MANIPULATION OF PLAYBACK DEVICE RESPONSE USING SIGNAL PROCESSING

CROSS REFERENCE TO RELATED APPLICATIONS

This application is a continuation of U.S. patent application Ser. No. 18/063,898, filed Dec. 9, 2022, now U.S. Pat. No. 11,974,114, which is a continuation of U.S. patent application Ser. No. 17/547,852 filed Dec. 10, 2021, now U.S. Pat. No. 11,528,573, which is a continuation of U.S. patent application Ser. No. 17/001,434 filed Aug. 24, 2020, now U.S. Pat. No. 11,202,160, which is a continuation of U.S. patent application Ser. No. 16/544,051 filed Aug. 19, 2019, now U.S. Pat. No. 10,812,922, which is a continuation of U.S. patent application Ser. No. 16/205,447 filed Nov. 30, 2018, now U.S. Pat. No. 10,433,092, which is a continuation of U.S. patent application Ser. No. 16/042,775 filed Jul. 23, 2018, now U.S. Pat. No. 10,149,085, which is a continuation of U.S. patent application Ser. No. 15/676,787 filed Aug. 14, 2017, now U.S. Pat. No. 10,034,115, which is a continuation of U.S. patent application Ser. No. 14/831,910 filed Aug. 21, 2015, U.S. Pat. No. 9,736,610, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
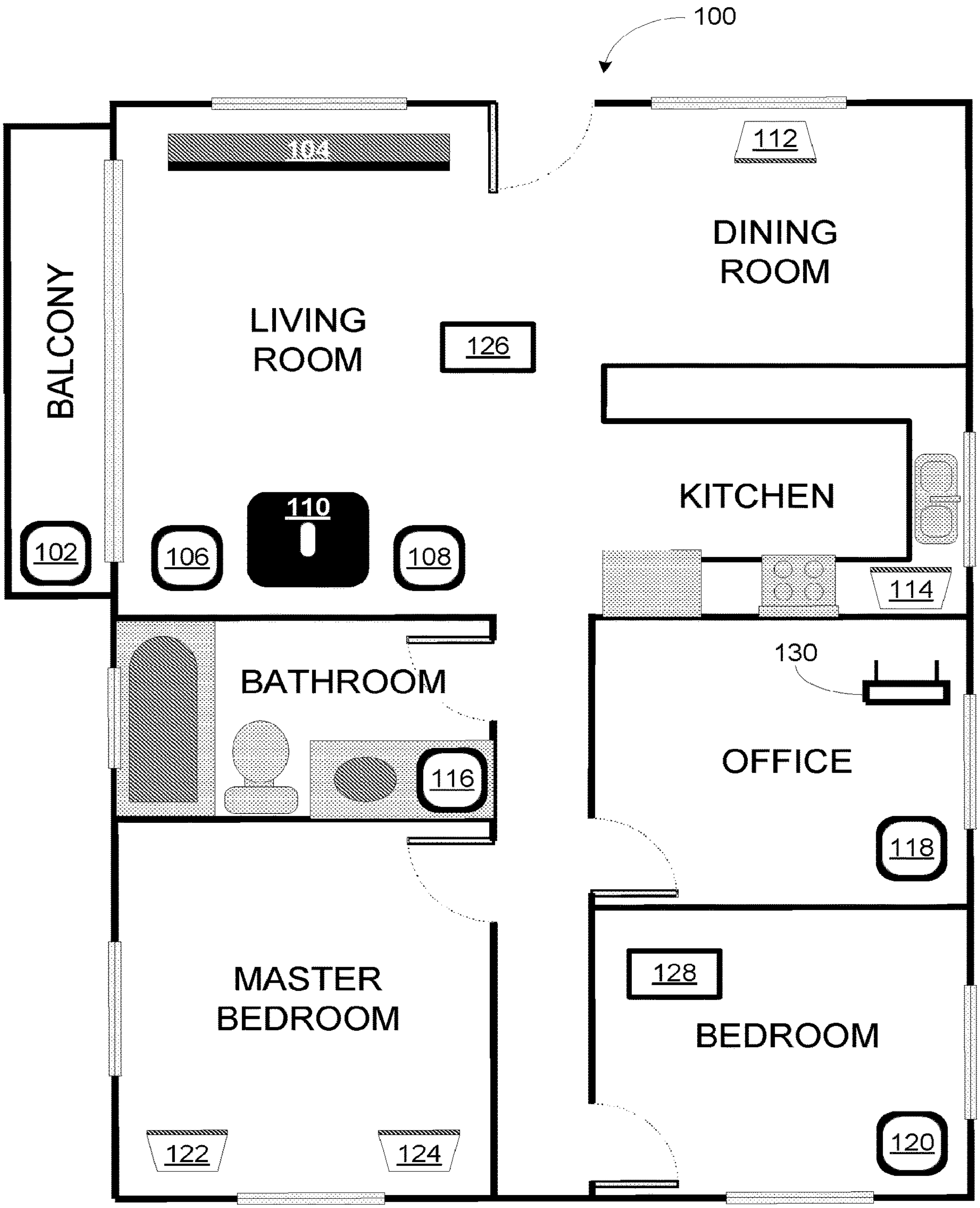
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Multi-channel playback of audio content may enhance a listener's experience by causing the listener to perceive a "wideness effect" when the audio content is played back. In some examples, multi-channel playback of the audio content may be facilitated by multiple groups of one or more audio drivers included as part of one or more playback devices that make up a playback system. In some cases, the wideness effect produced by a playback system performing multi-channel playback might only be perceivable at limited locations within the environment of the playback system. The locations at which a listener could perceive the wideness effect during playback may be increased by manipulating input signals provided to the various groups of audio drivers of the playback system.

In situations where the playback system is in a small room or the listener is close to the playback system, the listener may benefit from a less pronounced wideness effect. But, in situations where the playback system is in a large room or the listener is far from the playback system, the listener may benefit from a more pronounced wideness effect.

Regardless of whether multi-channel playback is facilitated via a playback system that includes a single playback device or multiple playback devices, the playback system may include at least a first group of one or more audio drivers and a second group of one or more audio drivers. In some cases, the playback system may also include a third group of one or more audio drivers. Each group of audio driver(s) may be configured to generate sound waves according to a particular radiation pattern. Such radiation patterns may define a direction-dependent amplitude of sound waves produced by the corresponding group of audio drivers (i) at a given audio frequency (or range of audio frequencies), (ii) at a given radius from the audio driver, (iii) for a given amplitude of input signal. A radiation pattern corresponding to a group of audio driver(s) may be dependent on the audio drivers' construction, structure, geometry, materials, and/or orientation and position within an enclosure of a playback device, for example.

In some instances, the playback system provides a center channel of the audio content to the first group, the second group, and if applicable, the third group. The first, second, and/or third groups may generate sound waves corresponding to the center channel according to a first radiation pattern having a maximum along a first direction (e.g., a center line of the playback system). The playback system may also provide a first side channel to the first group so that the first group may generate sound waves corresponding to the first side channel according to a second radiation pattern having a maximum along a second direction. The first radiation pattern and the second radiation pattern may combine via superposition to form a first response lobe that has a maximum along a third direction between the first and second directions. Since the first radiation pattern represents the center channel and the second radiation pattern represents the center channel and the first side channel, the first response lobe represents playback of both the center channel and the first side channel with a perceived wideness that is dependent on the relative input amplitudes of the center channel and the first side channel. That is, by increasing the amplitude of the center channel with respect to the first side channel, the maximum of the first response lobe is shifted toward the first direction, resulting in a "narrowed" multi-channel audio "image." Similarly, by decreasing the amplitude of the center channel with respect to the first side channel, the maximum of the first response lobe is shifted toward the second direction, resulting in a "widened" multi-channel audio "image."

In some applications, the playback system provides the center channel and a second side channel to the third group, causing the third group to generate sound waves corresponding to both the center channel and the second side channel according to a third radiation pattern having a maximum along a fourth direction. The first radiation pattern and the third radiation pattern may combine to form a second response lobe that has a maximum along a fifth direction between the first and fourth directions. Since the first radiation pattern represents the center channel and the third radiation pattern represents the center channel and the second side channel, the second response lobe represents playback of both the center channel and the second side channel with a perceived wideness that is dependent on the relative input amplitudes of the center channel and the second side channel. That is, by increasing the amplitude of the center channel with respect to the second side channel, the maximum of the second response lobe is shifted toward the first direction, resulting in a "narrowed" multi-channel audio "image." Similarly, by decreasing the amplitude of the center channel with respect to the second side channel, the maximum of the second response lobe is shifted toward the fourth direction, resulting in a "widened" multi-channel audio "image."

Using the above techniques, the wideness of the multi-channel audio image may be adjusted in accordance with the environment of the playback system. For example, the playback system may receive, via a user interface, input indicating (i) a size of a room that the playback system is located in and/or (ii) locations of walls or other sound barriers within the room. The playback system may use the received input to determine an appropriate wideness for the multi-channel audio image, and adjust the respective amplitudes of the center channel, first side channel, and/or second side channel accordingly. In some examples, a playback device of the playback system may be placed near a corner of a room, and for the sake of efficiency, it may be useful for that playback device to reproduce only the center channel and the first (or alternatively the second) side channel.

Accordingly, some examples described herein include, among other things, a playback device (i) providing a center channel of audio content to one or more first audio drivers and one or more second audio drivers so that the center channel is reproduced according to a first radiation pattern and (ii) providing a side channel of audio content to the one or more first audio drivers so that the side channel is reproduced according to a second radiation pattern. The first and second radiation patterns may combine to form a response lobe that has a maximum between the respective maxima of the first and second radiation patterns. Other aspects of the examples will be made apparent in the remainder of the description herein.

In one aspect, a playback device includes one or more processors, one or more first audio drivers, one or more second audio drivers, and a non-transitory computer-readable medium storing instructions that, when executed by the one or more processors, cause the playback device to perform functions. The functions include (a) receiving a left channel of audio content and a right channel of the audio content, (b) generating a center channel of the audio content comprising a combination of the left and right channels, (c) providing the generated center channel to (i) the one or more first audio drivers and (ii) the one or more second audio drivers for playback of the center channel according to a first radiation pattern that has a maximum along a first direction, (d) generating a side channel comprising a combination of (i) the center channel and (ii) a difference between the left channel and the right channel, and (e) providing the generated side channel to the one or more first audio drivers for playback of the side channel according to a second radiation pattern that has a maximum along a second direction. The first radiation pattern and the second radiation pattern combine to form a first response lobe that has a maximum along a third direction between the first and second directions.

In another aspect, a non-transitory computer-readable medium stores instructions that, when executed by a playback device, cause the playback device to perform functions. The playback device includes one or more first audio drivers and one or more second audio drivers. The functions include (a) receiving a left channel of audio content and a right channel of the audio content, (b) generating a center channel of the audio content comprising a combination of the left and right channels, (c) providing the generated center channel to (i) the one or more first audio drivers and (ii) the one or more second audio drivers for playback of the center channel according to a first radiation pattern that has a maximum along a first direction, (d) generating a side channel comprising a combination of (i) the center channel and (ii) a difference between the left channel and the right channel, and (e) providing the generated side channel to the one or more first audio drivers for playback of the side channel according to a second radiation pattern that has a maximum along a second direction. The first radiation pattern and the second radiation pattern combine to form a first response lobe that has a maximum along a third direction between the first and second directions.

In yet another aspect, a method is performed by a playback device comprising one or more first audio drivers and one or more second audio drivers. The method includes (a) receiving a left channel of audio content and a right channel of the audio content, (b) generating a center channel of the audio content comprising a combination of the left and right channels, (c) providing the generated center channel to (i) the one or more first audio drivers and (ii) the one or more second audio drivers for playback of the center channel according to a first radiation pattern that has a maximum along a first direction, (d) generating a side channel comprising a combination of (i) the center channel and (ii) a difference between the left channel and the right channel, and (e) providing the generated side channel to the one or more first audio drivers for playback of the side channel according to a second radiation pattern that has a maximum along a second direction. The first radiation pattern and the second radiation pattern combine to form a first response lobe that has a maximum along a third direction between the first and second directions.

In yet another aspect, a playback device includes one or more processors, one or more first audio drivers, one or more second audio drivers, one or more third audio drivers, and a non-transitory computer-readable medium storing instructions that, when executed by the one or more processors, cause the playback device to perform functions. The functions include (a) receiving a center channel of audio content and a side channel of the audio content, (b) providing the center channel of the audio content to (i) the one or more first audio drivers, (ii) the one or more second audio drivers, and (iii) the one or more third audio drivers for playback of the center channel according to a first radiation pattern that has a maximum along a first direction, (c) providing the side channel to the one or more first audio drivers for playback of the side channel according to a second radiation pattern that has a maximum along a second direction. The first radiation pattern and the second radiation pattern combine to form a first response lobe that has a maximum along a third direction between the first and second directions. The functions further include (d) generating an inverted side channel comprising an inverse of the side channel and (e) providing the inverted side channel to the one or more third audio drivers for playback of the inverted side channel according to a third radiation pattern that has a maximum along a fourth direction. The first radiation pattern and the third radiation pattern combine to form a second response lobe that has a maximum along a fifth direction between the first and fourth directions.

In yet another aspect, a non-transitory computer-readable medium stores instructions that, when executed by a playback device, cause the playback device to perform functions. The playback device includes one or more first audio drivers, one or more second audio drivers, and one or more third audio drivers. The functions include (a) receiving a center channel of audio content and a side channel of the audio content, (b) providing the center channel of the audio content to (i) the one or more first audio drivers, (ii) the one or more second audio drivers, and (iii) the one or more third audio drivers for playback of the center channel according to a first radiation pattern that has a maximum along a first direction, (c) providing the side channel to the one or more first audio drivers for playback of the side channel according to a second radiation pattern that has a maximum along a second direction. The first radiation pattern and the second radiation pattern combine to form a first response lobe that has a maximum along a third direction between the first and second directions. The functions further include (d) generating an inverted side channel comprising an inverse of the side channel and (e) providing the inverted side channel to the one or more third audio drivers for playback of the inverted side channel according to a third radiation pattern that has a maximum along a fourth direction. The first radiation pattern and the third radiation pattern combine to form a second response lobe that has a maximum along a fifth direction between the first and fourth directions.

In yet another aspect, a method is performed by a playback device comprising one or more first audio drivers, one or more second audio drivers, and one or more third audio drivers. The method includes (a) receiving a center channel of audio content and a side channel of the audio content, (b) providing the center channel of the audio content to (i) the one or more first audio drivers, (ii) the one or more second audio drivers, and (iii) the one or more third audio drivers for playback of the center channel according to a first radiation pattern that has a maximum along a first direction, (c) providing the side channel to the one or more first audio drivers for playback of the side channel according to a second radiation pattern that has a maximum along a second direction. The first radiation pattern and the second radiation pattern combine to form a first response lobe that has a maximum along a third direction between the first and second directions. The functions further include (d) generating an inverted side channel comprising an inverse of the side channel and (e) providing the inverted side channel to the one or more third audio drivers for playback of the inverted side channel according to a third radiation pattern that has a maximum along a fourth direction. The first radiation pattern and the third radiation pattern combine to form a second response lobe that has a maximum along a fifth direction between the first and fourth directions.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102, 104, 106, 108, 110, 112, 114, 116, 118, 120, 122, and 124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
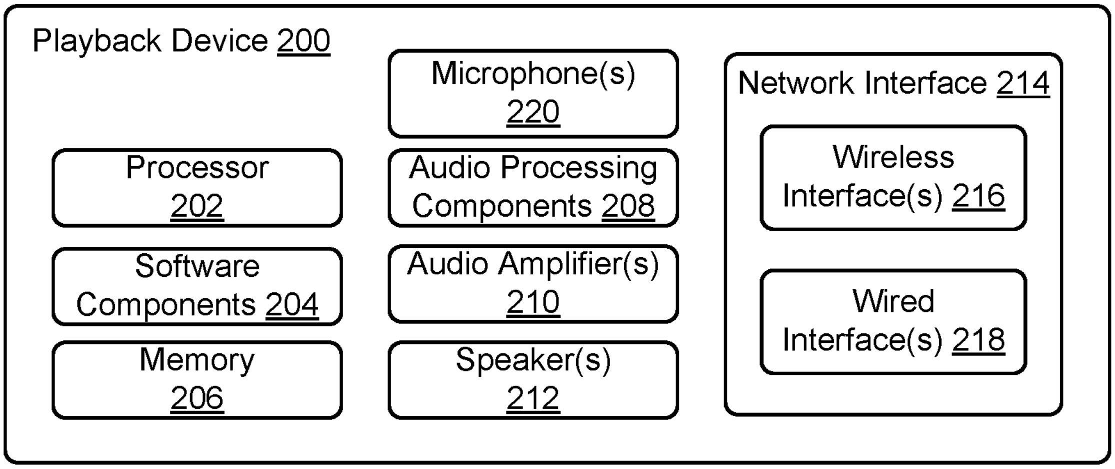
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY: 1," "PLAY: 3," "PLAY: 5," "PLAYBAR," "CONNECT: AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being played by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
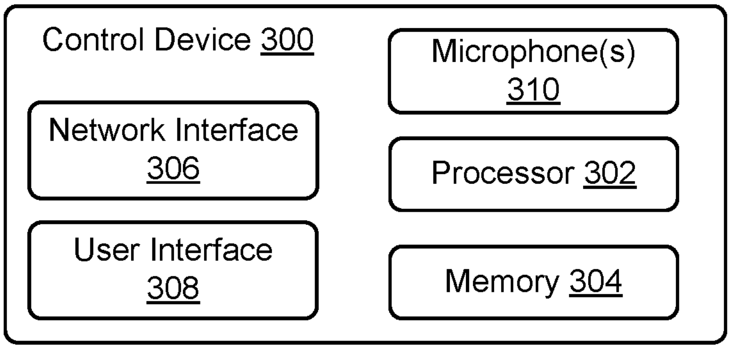
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
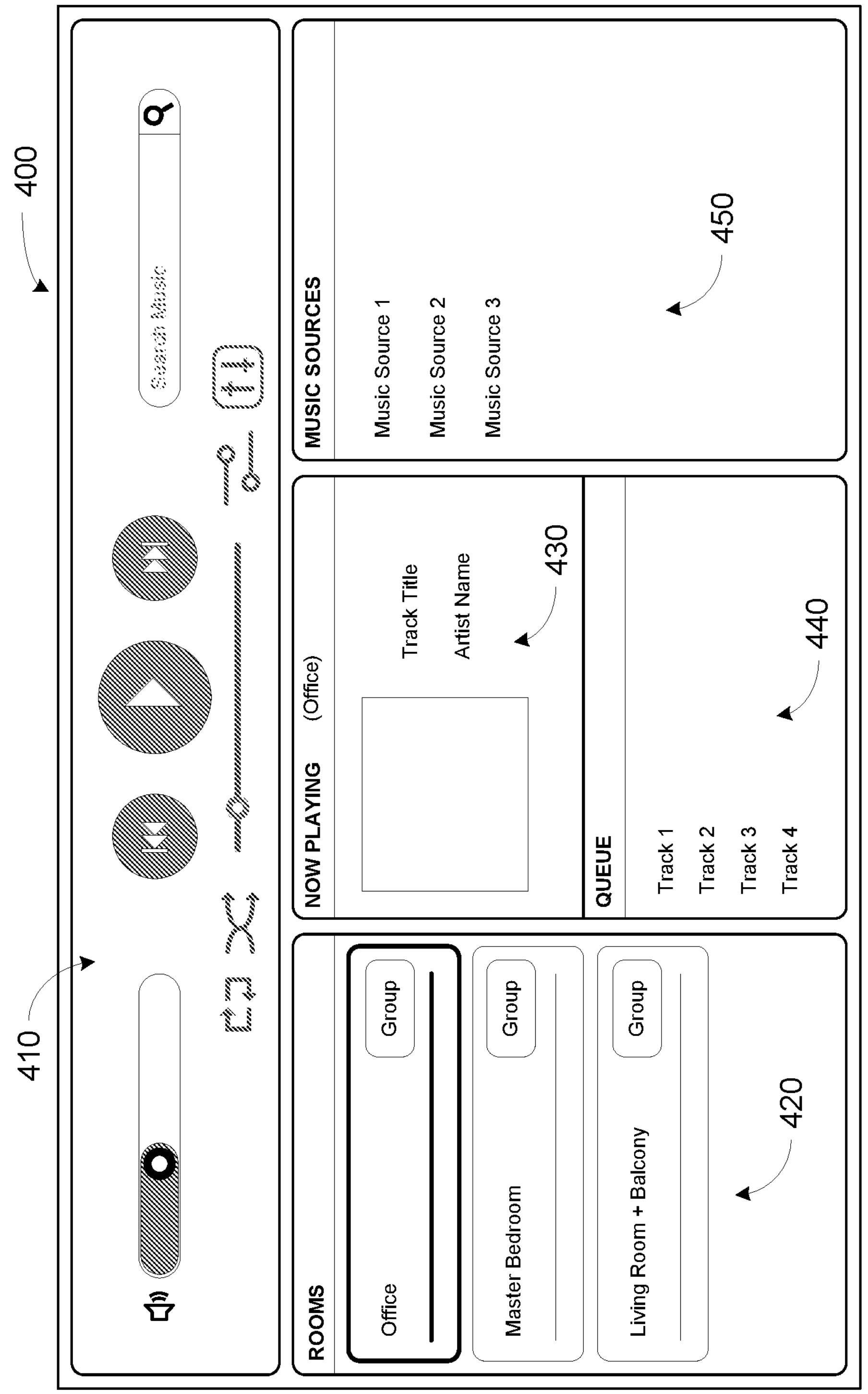
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods and Systems Related to Manipulation of Playback Device Response Using Signal Processing As discussed above, some examples described herein include, among other things, a playback device (i) providing a center channel of audio content to one or more first audio drivers and one or more second audio drivers so that the center channel is reproduced according to a first radiation pattern and (ii) providing a side channel of audio content to the one or more first audio drivers so that the side channel is reproduced according to a second radiation pattern. The first and second radiation patterns may combine to form a response lobe that has a maximum between the respective maxima of the first and second radiation patterns. Other aspects of the examples will be made apparent in the remainder of the description herein.

Figure 5A:
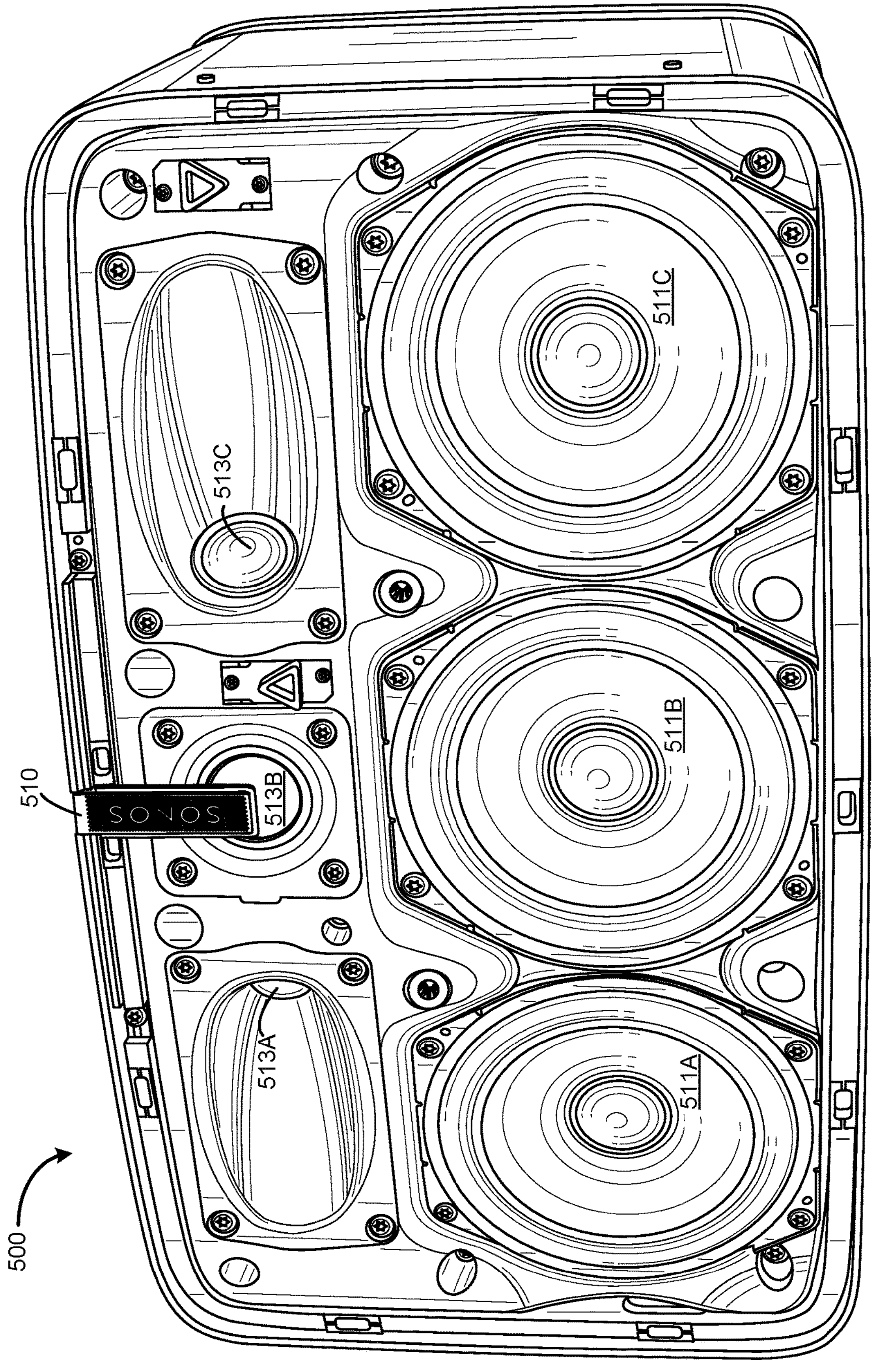
FIG. 5A shows an example playback device.

FIG. 5A shows an example playback device 500. The playback device 500 includes audio drivers 511A, 511B, 511C, 513A, 513B, and 513C. The audio drivers 511A-C may comprise woofers configured to reproduce low-range and/or mid-range audio frequencies whereas the audio drivers 513A-C may comprise tweeters configured to reproduce high-range frequencies. Other audio driver configurations are possible.

The playback device 500 may also include an acoustic filter 510 placed in front of the audio driver 513B that is configured to attenuate sound waves generated by the audio driver 513B. In other examples, the acoustic filter 510 may be placed in front of another audio driver of the playback device 500 for attenuation of sound waves generated by the other audio driver. More detailed examples of the acoustic filter 510 are included in U.S. Non-Provisional patent application Ser. No. 14/831,903, filed on Aug. 21, 2015, the entirety of which is incorporated by reference in its entirety.

Figure 5B:
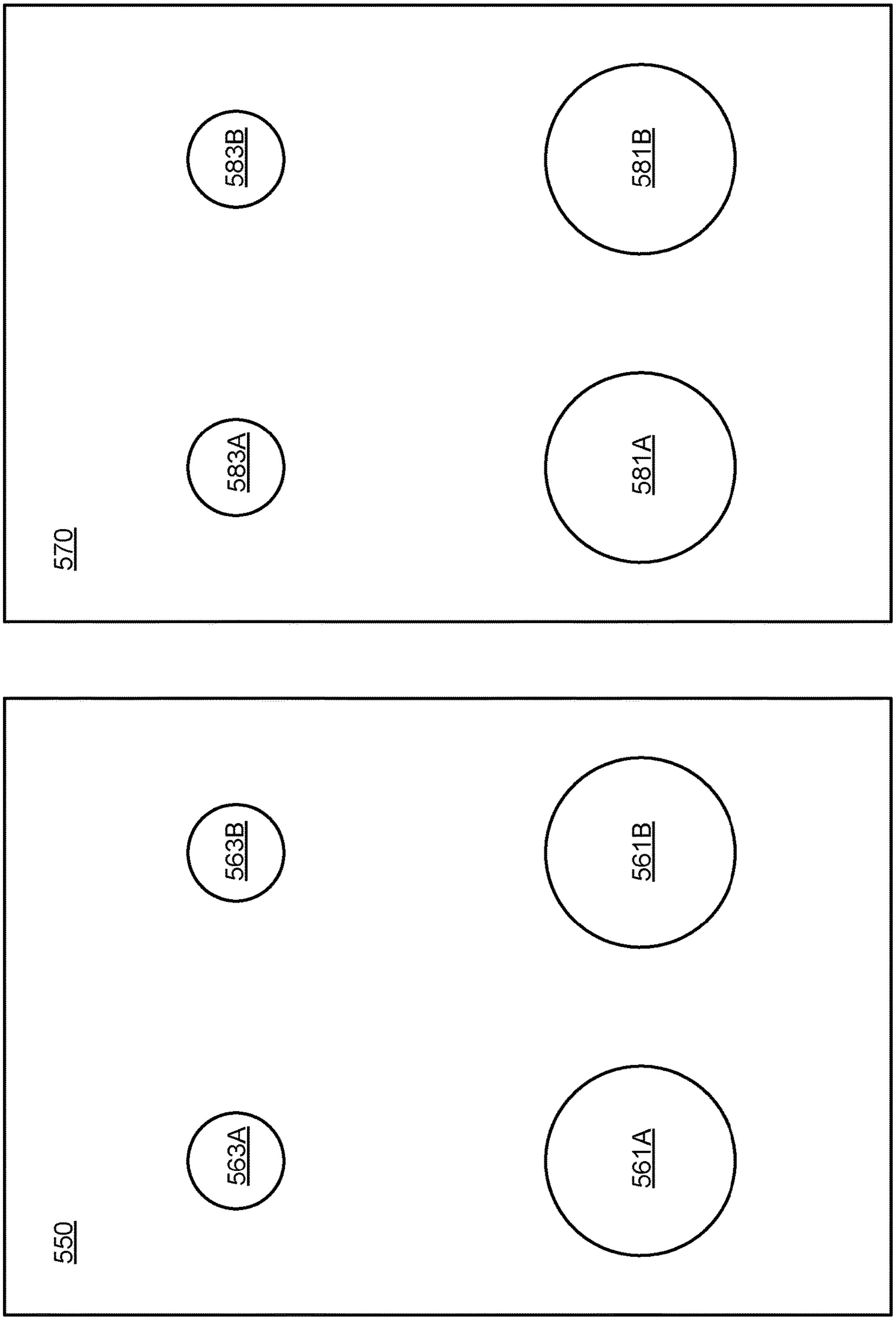
FIG. 5B shows a simplified block diagram of example playback devices.

FIG. 5B shows a simplified block diagram of playback devices 550 and 570. The playback device 550 includes audio drivers 561A, 561B, 563A, and 563B. The playback device 570 includes audio drivers 581A, 581B, 583A, and 583B. In some examples, the audio drivers 561A, 561B, 581A, and 581B may comprise woofers configured to reproduce low-range and/or mid-range audio frequencies whereas the audio drivers 563A, 563B, 583A, and 583B may comprise tweeters configured to reproduce high-range frequencies, but other audio driver configurations are possible.

Figure 6:
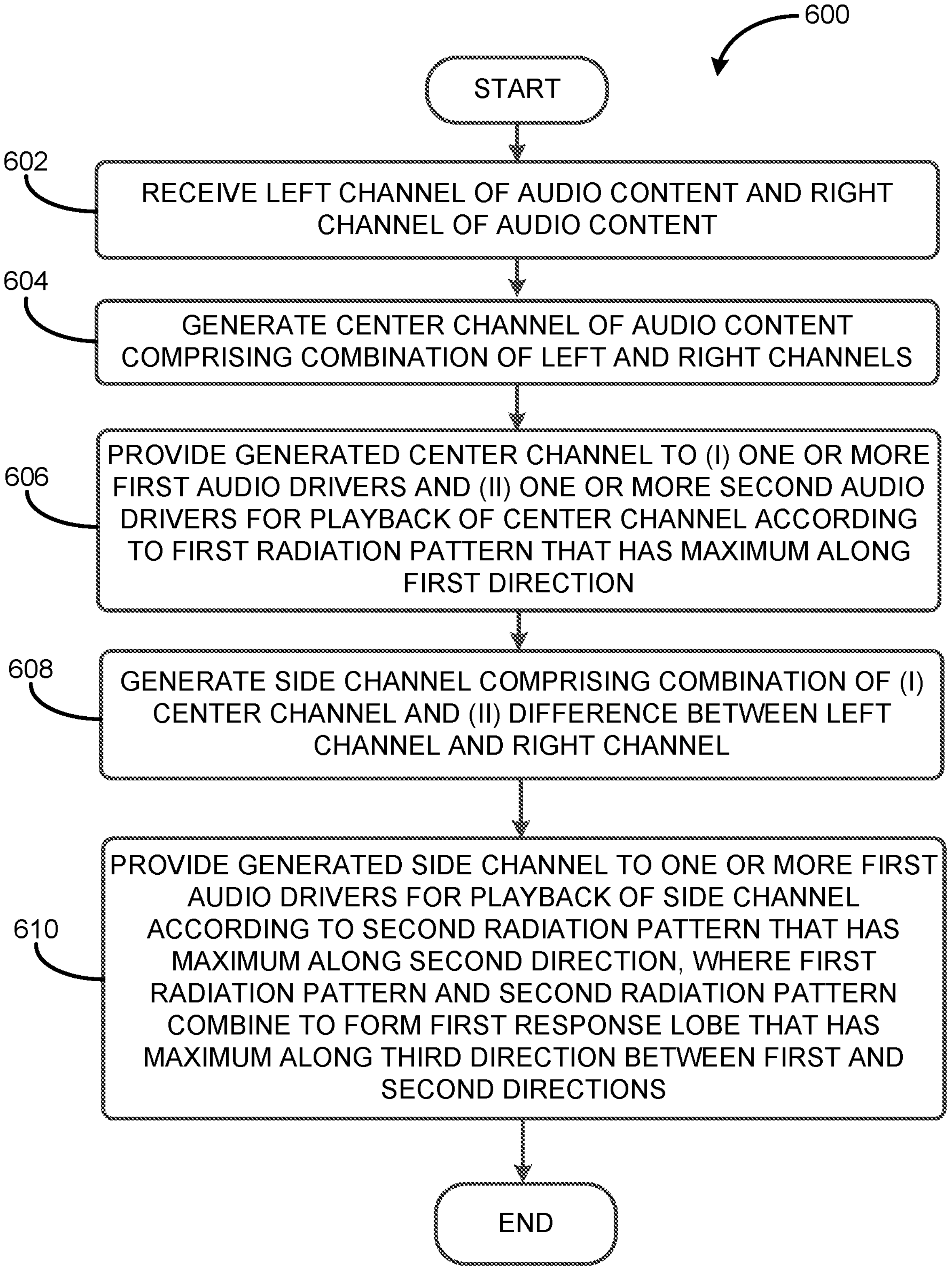
FIG. 6 shows a flow diagram for an example method.
Figure 7:
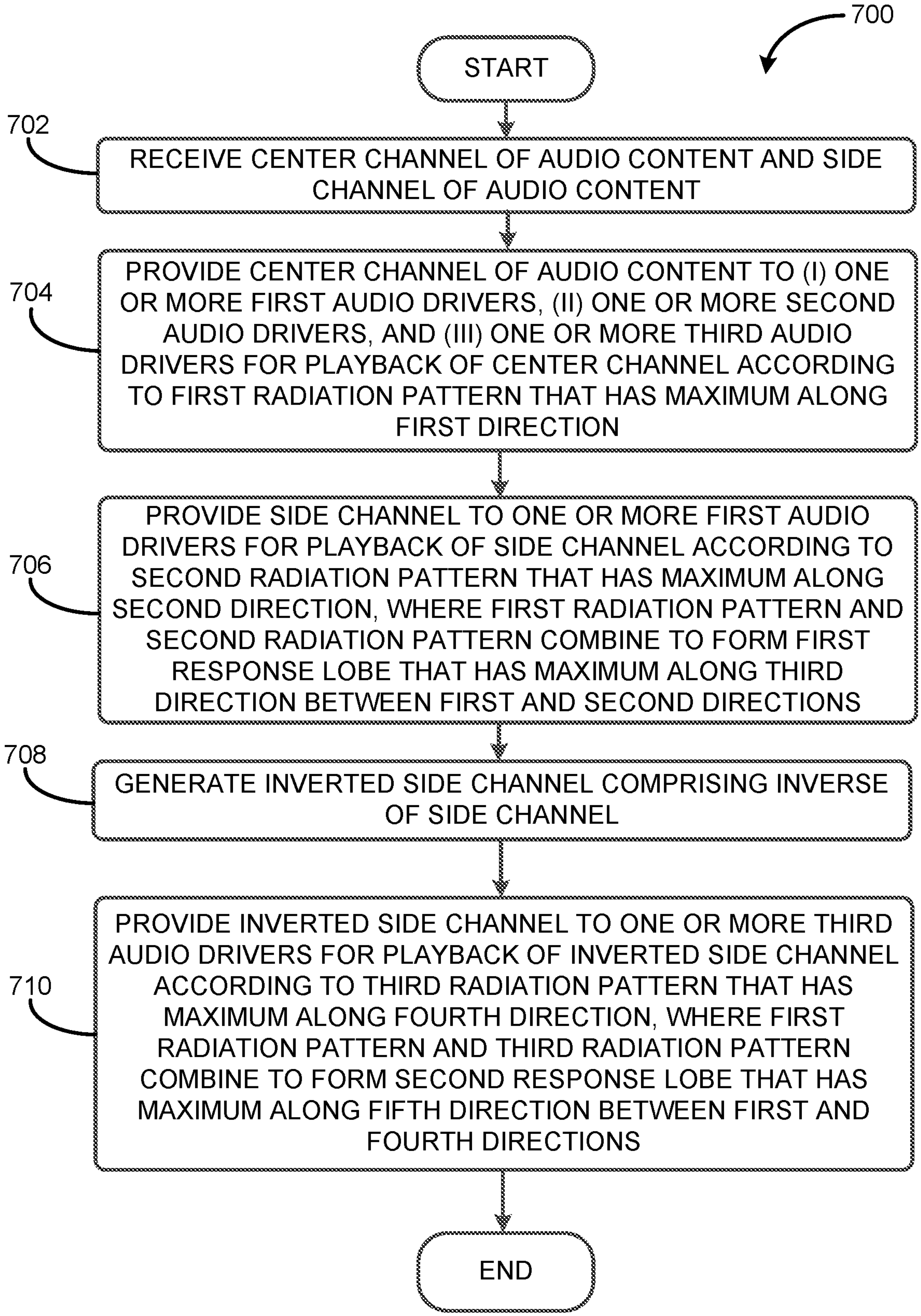
FIG. 7 shows a flow diagram for an example method.

Methods 600 and 700 respectively shown in FIGS. 6 and 7 present example methods that can be implemented within an operating environment including, for example, one or more of the media playback system 100 of FIG. 1, one or more of the playback device 200 of FIG. 2, one or more of the control device 300 of FIG. 3, one or more of the playback device 500 of FIG. 5A, and one or more of the playback devices 550 and/or 570 of FIG. 5B. Methods 600 and 700 may include one or more operations, functions, or actions as illustrated by one or more of blocks 602, 604, 606, 608, 610, 702, 704, 706, 708, and 710. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 600 and 700 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk(s) or hard drive(s). In some embodiments, the program code may be stored in memory (e.g., disks or disk arrays) associated with and/or connected to a server system that makes the program code available for download (e.g., an application store or other type of server system) to desktop/laptop computers, smart phones, tablet computers, or other types of computing devices. The computer-readable medium may include non-transitory computer-readable media, for example, such as computer-readable media that stores data for short periods of time like register memory, processor cache, and Random Access Memory (RAM). The computer-readable medium may also include non-transitory media, such as secondary or persistent long-term storage, like read-only memory (ROM), optical or magnetic disks, compact-disc read-only memory (CD-ROM), for example. The computer-readable media may also be any other volatile or non-volatile storage systems. The computer-readable medium may be considered a computer-readable storage medium, for example, or a tangible storage device. In addition, for the methods 600 and 700 and other processes and methods disclosed herein, each block in FIGS. 6 and 7 may represent circuitry that is wired to perform the specific logical functions in the process.

In some examples, the method 600 is performed by a playback device comprising one or more first audio drivers and one or more second audio drivers (e.g., playback devices 500, 550, or 570). At block 602, the method 600 includes receiving a left channel of audio content and a right channel of the audio content. For example, any of the playback devices 500, 550, or 570 may receive the left channel and/or the right channel from one or more other playback devices, from one or more network locations, or from any audio content source described in section II.d above. The playback device may receive the left and right channels from other sources as well. The left and right channels may be received as an analog signal or a digital data stream, for example.

At block 604, the method 600 includes generating a center channel of the audio content comprising a combination of the left and right channels. For instance, any of the playback devices 500, 550, or 570 may add amplitudes corresponding to various times (e.g., track time) and audio frequencies of the left channel with respective amplitudes corresponding to various times and audio frequencies of the right channel. In a specific example, the playback device may add a first amplitude "x" corresponding to t=1 second(s) and f=5 kHz of the left channel with a second amplitude "y" corresponding to t=1 s and f=5 kHz of the right channel, resulting in an amplitude of (x+y) corresponding to t=1 s and f=5 kHz of the center channel. In some examples, the amplitude of the center channel may be adjusted (e.g., averaged) to avoid volume distortion. Accordingly, the amplitude of the center channel corresponding to t=1 s and f=5 kHz may be (x+y)/2. Other example combinations of the left and right channels are also possible. Block 604 may be repeated for any or all of the times and frequencies represented by the left and right channels to generate the center channel.

At block 606, the method 600 includes providing the generated center channel to (i) the one or more first audio drivers and (ii) the one or more second audio drivers for playback of the center channel according to a first radiation pattern that has a maximum along a first direction. (In various examples described below, the generated center channel is also provided to one or more third audio drivers of the playback device.) For example, any of the playback devices 500, 550, or 570 may provide a digital data stream representing the center channel to a digital-to-analog converter (DAC) of the corresponding playback device so that the DAC may provide an analog signal representing the center channel to (i) the one or more first audio drivers of the corresponding playback device and (ii) the one or more second audio drivers of the corresponding playback device.

In some examples, the playback device 500 may provide multi-channel playback of the audio content independently (e.g., without coordination with other playback devices). In such an instance, the playback device 500 may provide the generated center channel to first audio drivers 511A and 513A, second audio drivers 511B and 513B, and third audio drivers 511C and 513C. The audio drivers 511A-C and 513A-C may play the center channel according to a first radiation pattern 802 depicted in FIG. 8A. The first radiation pattern 802 may have a maximum aligned with axis 801. In such an example, the playback device 500 may be located at the intersection of axes 801 and 803. The intersection of axes 801 and 803 may also be referred to as an acoustic center of the playback device 500.

In other examples, the playback device 550 may provide multi-channel playback of the audio content in coordination with the playback device 570. In such an instance, the playback device 550 may provide the center channel to first audio drivers 561A and 563A and second audio drivers 561B and 563B, and the playback device 570 may provide the center channel to the audio drivers 581A, 581B, 583A, and 583B. The audio drivers 561A, 561B, 563A, 563B, 581A, 581B, 583A, and 583B may play the center channel in coordination according to the first radiation pattern 802. In such an example, the playback devices 550 and 570 may both be on the axis 803 and be spaced symmetrically with respect to axis 801. The intersection of axes 801 and 803 may be referred to as an acoustic center of a playback system that includes playback devices 550 and 570.

In some examples, providing the generated center channel to (i) the one or more first audio drivers, (ii) the one or more second audio drivers, and/or (iii) the one or more third audio drivers may include providing an amplified or attenuated center channel to (i) the one or more first audio drivers, (ii) the one or more second audio drivers, and/or (iii) the one or more third audio drivers.

For example, the playback device 500 may amplify or attenuate the center channel by a scaling factor of 'C' before the playback device 500 provides the amplified or attenuated center channel to the first audio drivers 511A and 513A, the second audio drivers 511B and 513B, and/or the third audio drivers 511C and 513C. With reference to an example described above in which the amplitude of the generated center channel is (x+y)/2 at t=1 s and f=5 kHz, the amplified or attenuated center channel provided to the to the first audio drivers 511A and 513A, the second audio drivers 511B and 513B, and the third audio drivers 511C and 513C may be represented as C (x+y)/2 at t=1 s and f=5 kHz. A scaling factor of 'C' that is greater than 1 may correspond to an amplified center channel whereas a scaling factor of 'C' that is less than 1 may correspond to an attenuated center channel.

In another example, the playback device 550 may amplify or attenuate the center channel by a scaling factor of 'C' before the playback device 550 provides the amplified or attenuated center channel to the first audio drivers 561A and 563A and the second audio drivers 561B and 563B. The playback device 570 may also amplify or attenuate the center channel by a scaling factor of 'C' before the playback device 570 provides the amplified or attenuated center channel to the audio drivers 581A, 583A, 581B, and 583B. With reference to an example described above in which the amplitude of the generated center channel is (x+y)/2 at t=1 s and f=5 kHz, the amplified or attenuated center channel provided to the to the first audio drivers 561A and 563A and the second audio drivers 561B and 563B may be represented as C (x+y)/2. The amplified or attenuated center channel provided to the audio drivers 581A, 583A, 581B, and 583B may also be represented as C (x+y)/2 at t=1 s and f=5 kHz.

Amplifying or attenuating the center channel may affect the perceived wideness of audio playback by the corresponding playback device, as described below. In some cases, the same scaling factor 'C' may be used to amplify or attenuate all portions of the center channel, but in other cases different scaling factors may be used for various frequencies and/or times of the center channel.

At block 608, the method 600 includes generating a first side channel comprising a combination of (i) the center channel and (ii) a difference between the left channel and the right channel. (In some examples described below, the method 600 may also involve generating a second side channel.)

For instance, any of the playback devices 500, 550, or 570 may subtract amplitudes corresponding to various times and frequencies of the right channel from respective amplitudes corresponding to various times and frequencies of the left channel (or vice versa). In a specific example, the playback device may subtract a second amplitude "y" corresponding to t=1 s and f=5 kHz of the right channel from a first amplitude "x" corresponding to t=1 s and f=5 kHz of the left channel, resulting in an amplitude of (x-y) corresponding to t=1 s and f=5 kHz of the difference between the left channel and the right channel. In some examples, amplitudes may be adjusted (e.g., averaged) to avoid volume distortion. Accordingly, the amplitude of the difference between the left channel and the right channel corresponding to t=1 s and f=5 kHz may be (x-y)/2.

In addition, any of the playback devices 500, 550, or 570 may add amplitudes corresponding to various times and audio frequencies of center channel with respective amplitudes corresponding to various times and audio frequencies of the difference between the left channel and the right channel. For example, an amplitude (x-y)/2 of the difference between the left channel and the right channel corresponding to t=1 s and f=5 kHz may be added to an amplitude (x+y)/2 of the center channel corresponding to t=1 s and f=5 kHz, resulting in an amplitude of the first side channel of (x+y)/2+(x-y)/2. In some cases, actual numeric summation of the amplitudes of the center channel and the amplitudes of the difference between the left and right channels may be deferred until the center channel and the difference between the left and right channels have been amplified or attenuated, as described below.

Block 608 may be repeated for any or all of the times and frequencies represented by the center channel and the difference between the left channel and the right channel to generate the first side channel.

At block 610, the method 600 includes providing the generated first side channel to the one or more first audio drivers for playback of the first side channel according to a second radiation pattern that has a maximum along a second direction. (In various examples described below, a generated second side channel is also provided to one or more third audio drivers of the playback device.) For example, any of the playback devices 500, 550, or 570 may provide a digital data stream representing the first side channel to a digital-to-analog converter (DAC) of the corresponding playback device so that the DAC may provide an analog signal representing the first side channel to the one or more first audio drivers of the corresponding playback device.

The first radiation pattern corresponding to the center channel and the second radiation pattern corresponding to the first side channel may combine to form a first response lobe that has a maximum along a third direction between the first and second directions. The first response lobe may represent audio information from both the center channel and the first side channel. A listener may perceive audio corresponding to the first response lobe as having a wideness that is dependent on the relative amplitudes of (i) the center channel provided to the one or more first audio drivers, the one or more second audio drivers, and/or the one or more third audio drivers, and (ii) the first side channel provided to the one or more first audio drivers.

Accordingly, in some examples providing the generated first side channel to the one or more first audio drivers may include providing an amplified or attenuated first side channel to the one or more first audio drivers.

In an example where the playback device 500 provides multi-channel playback of the audio content independently (e.g., without coordination with other playback devices), the playback device 500 may amplify or attenuate the first side channel by scaling factors of 'C' and/or 'S' before the amplified or attenuated first side channel is provided to the first audio drivers 511A and 513A. With reference to examples described above, the amplified or attenuated first side channel (e.g., at t=1 s and f=5 kHz) provided to the first audio drivers 511A and 513A may be represented as C (x+y)/2+S (x-y)/2.

Figure 8A:
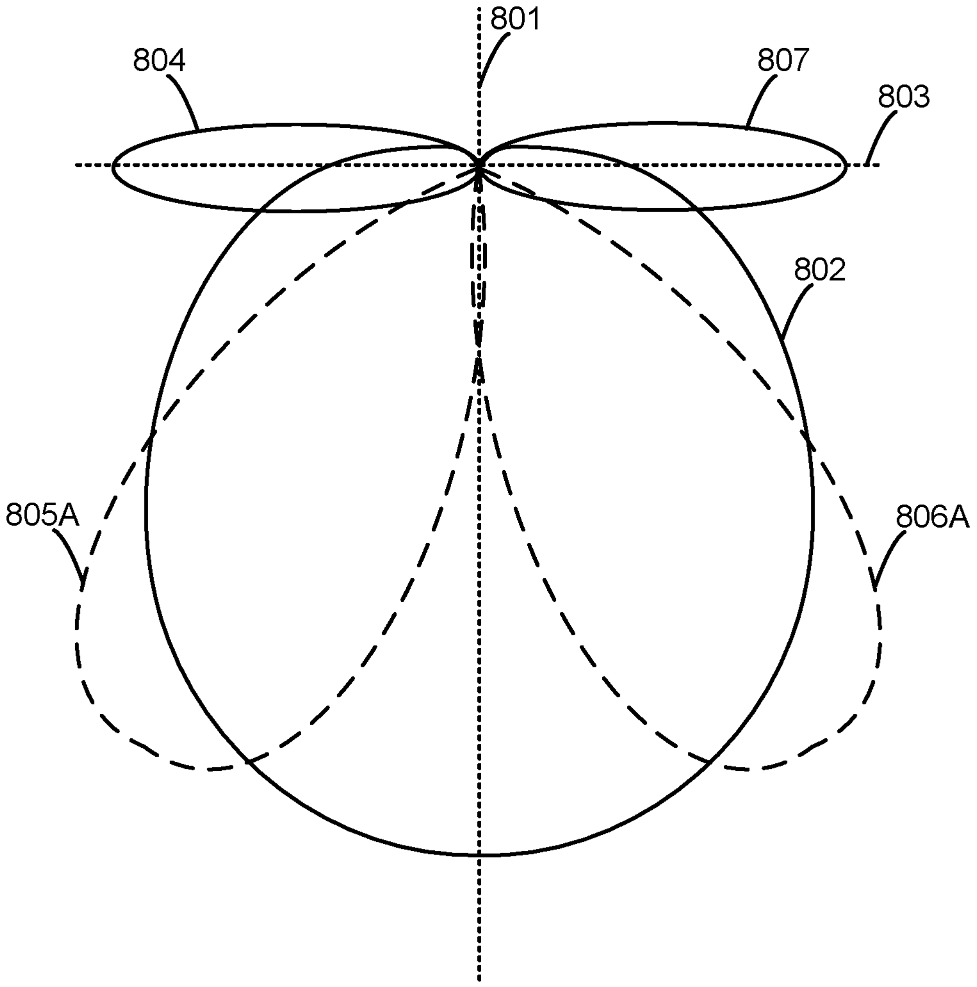
FIG. 8A shows example radiation patterns and example response lobes.

The audio drivers 511A and 513A may play the first side channel according to a second radiation pattern 804 depicted in FIG. 8A. The second radiation pattern 804 may have a maximum along the axis 803. The first radiation pattern 802 and the second radiation pattern 804 may combine to form a first response lobe 805A having a maximum along a third direction between the respective maxima of the first radiation pattern 802 and the second radiation pattern 804. The first response lobe 805A may represent audio information from both the center channel and the first side channel. A listener may hear audio corresponding to the first response lobe 805A as having a wideness that is dependent on the relative amplitudes of (i) the center channel provided to the audio drivers 511A, 513A, 511B, 513B, 511C, and 513C and (ii) the first side channel provided to the audio drivers 511A and 513A. As discussed below, the perceived wideness may be proportional to S/C as determined by the selected values of 'S' and 'C.'

In an example where the playback device 550 provides multi-channel playback of the audio content in coordination with the playback device 570, the playback device 550 may amplify or attenuate the first side channel by scaling factors of 'C' and 'S' before the amplified or attenuated first side channel is provided to the first audio drivers 561A and 563A. With reference to examples described above, the amplified or attenuated first side channel (e.g., at t=1 s and f=5 kHz) provided to the audio drivers 561A and 563A may be represented as C (x+y)/2+S (x-y)/2.

In some cases, the same scaling factor 'C' and/or 'S' may be used to amplify or attenuate all portions of the first side channel, but in other cases different scaling factors may be used for various frequencies and/or times of the center channel.

The audio drivers 561A and 563A may play the first side channel according to the second radiation pattern 804. The first radiation pattern 802 and the second radiation pattern 804 may combine to form a first response lobe 805A having a maximum along a third direction between the respective maxima of the first radiation pattern 802 and the second radiation pattern 804. The first response lobe 805A may represent audio information from both the center channel and the first side channel. A listener may hear audio corresponding to the first response lobe 805A as having a wideness that is dependent on the relative amplitudes of (i) the center channel provided to the audio drivers 561A, 563A, 561B, 563B, 581A, 583A, 581B, and 583B and (ii) the first side channel provided to the audio drivers 561A and 563A. That is, the perceived wideness may be proportional to S/C as determined by the selected values of 'S' and 'C.'

Figure 8B:
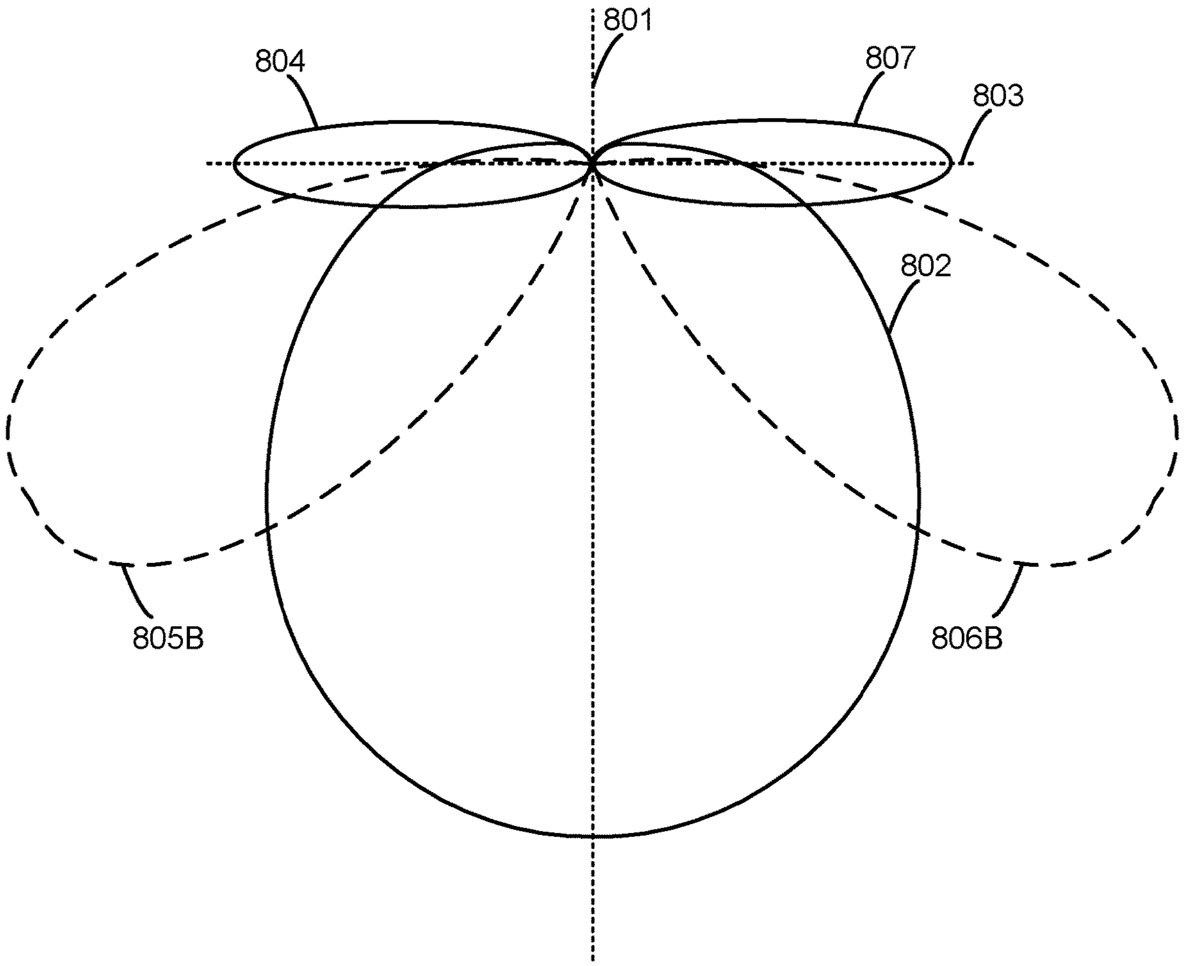
FIG. 8B shows further example radiation patterns and further example response lobes.
Figure 8C:
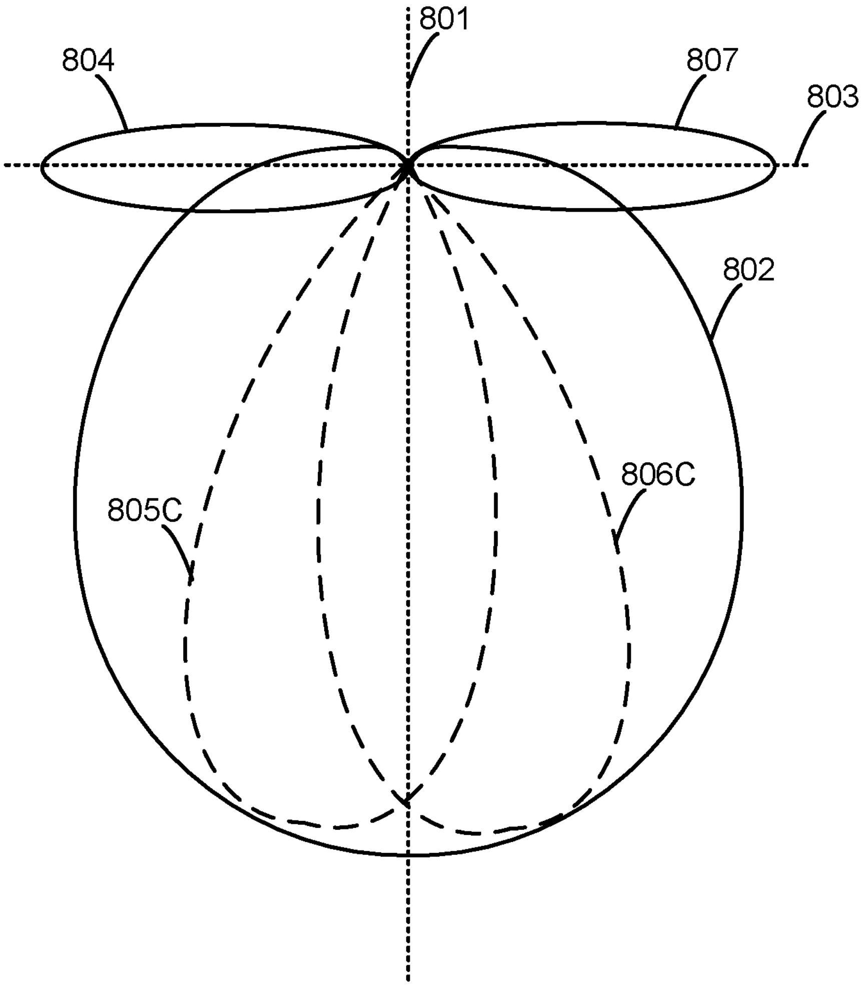
FIG. 8C shows yet further example radiation patterns and further example response lobes.

For purposes of illustration, assume that the first response lobe 805A represents playback of the center channel with a scaling factor C=2 and playback of the first side channel with a scaling factor of S=1. Changing C=2 to C=1.5 may cause first response lobe 805A to realign so that the maximum of the first response lobe is more closely aligned with the axis 803 (e.g., the maximum of the second radiation pattern 804) as shown at first response lobe 805B of FIG. 8B. The alignment of the first response lobe 805B may be more suited for a large room listening environment when compared to the alignment of the first response lobe 805A. Similarly, changing to C=2 to C=3 may cause the first response lobe 805A to realign so that the maximum of the first response lobe is more closely aligned with the axis 801 (e.g., the maximum of the first radiation pattern 802) as shown at first response lobe 805C of FIG. 8C. The alignment of the first response lobe 805C may be more suited for a small room listening environment when compared to the alignment of the first response lobe 805A.

In another example, assume that the first response lobe 805A represents playback of the center channel with a scaling factor C=2 and playback of the first side channel with a scaling factor of S=1. Changing S=1 to S=1.5 may cause first response lobe 805A to realign so that the maximum of the first response lobe is more closely aligned with the axis 803 (e.g., the maximum of the second radiation pattern 804) as shown at 805B of FIG. 8B. Similarly, changing S=1 to S=0.5 may cause the first response lobe 805A to realign so that the maximum of the first response lobe is more closely aligned with the axis 801 (e.g., the maximum of the first radiation pattern 802) as shown at first response lobe 805C of FIG. 8C.

The method 600 may further involve generating a second side channel comprising a combination of (i) the center channel and (ii) an inverse of the difference between the left channel and the right channel. For instance any of the playback devices 500, 550, or 570 may subtract amplitudes corresponding to various times and frequencies of the left channel from respective amplitudes corresponding to various times and frequencies of the right channel (or vice versa). In a specific example, the playback device may subtract a first amplitude "x" corresponding to t=1 s and f=5 kHz of the left channel from a second amplitude "y" corresponding to t=1 s and f=5 kHz of the right channel, resulting in an amplitude of (y−x) corresponding to t=1 s and f=5 kHz of the inverse of the difference between the left channel and the right channel. In some cases, instead of performing a subtraction operation, the playback device may calculate an additive inverse of the difference between the left channel and the right channel. Amplitudes may be adjusted (e.g., averaged) to avoid volume distortion. Accordingly, the amplitude of the inverse of the difference between the left channel and the right channel corresponding to t=1 s and f=5 kHz may be (y−x)/2.

In addition, any of the playback devices 500, 550, or 570 may add amplitudes corresponding to various times and audio frequencies of the center channel with respective amplitudes corresponding to various times and audio frequencies of the inverse of the difference between the left channel and the right channel. For example, an amplitude (y−x)/2 of the inverse of the difference between the left channel and the right channel corresponding to t=1 s and f=5 kHz may be added to an amplitude (x+y)/2 of the center channel corresponding to t=1 s and f=5 kHz, resulting in an amplitude of the second side channel of (x+y)/2+ (y−x)/2. In some cases, actual numeric summation of the amplitudes of the center channel and the amplitudes of the inverse of the difference between the left and right channels may be deferred until the center channel and the inverse of the difference between the left and right channels have been amplified or attenuated, as described below. This may be repeated for any or all of the times and frequencies represented by the center channel and the inverse of the difference between the left channel and the right channel to generate the second side channel.

The method 600 may further involve providing the generated second side channel to the one or more third audio drivers for playback of the second side channel according to a third radiation pattern that has a maximum along a fourth direction. In this context, the first radiation pattern and the third radiation pattern may combine to form a second response lobe that has a maximum along a fifth direction between the first and fourth directions. The second response lobe may represent audio information from both the center channel and the second side channel. A listener may perceive audio corresponding to the second response lobe as having a wideness that is dependent on the relative amplitudes of (i) the center channel provided to the one or more first audio drivers, the one or more second audio drivers, and/or the one or more third audio drivers, and (ii) the second side channel provided to the one or more third audio drivers.

For example, the playback device 500 may provide the center channel to the third audio drivers 511C and 513C, in addition to the first audio drivers 511A and 513A and the second audio drivers 511B and 513B. The playback device 500 may also provide the generated second side channel to the audio drivers 511C and 513C. The audio drivers 511C and 513C may play the second side channel according to a third radiation pattern 807 depicted in FIG. 8A. The first radiation pattern 802 and the third radiation pattern 807 may combine to form a second response lobe 806A having a maximum between the respective maxima of the first radiation pattern 802 and the third radiation pattern 807. The second response lobe 806A may represent audio information from both the center channel and the second side channel. A listener may hear audio corresponding to the second response lobe 806A as having a wideness that is dependent on the relative amplitudes of (i) the center channel provided to the audio drivers 511A-C and 513A-C and (ii) the second side channel provided to the audio drivers 511C and 513C.

In an example where, the playback device 550 provides multi-channel playback of the audio content in coordination with the playback device 570, the playback device 570 may provide the generated second side channel to the audio drivers 581B and 583B. The audio drivers 581B and 583B may play the second side channel according to the third radiation pattern 807. The first radiation pattern 802 and the third radiation pattern 807 may combine to form a second response lobe 806A having a maximum between the respective maxima of the first radiation pattern 802 and the third radiation pattern 807. The second response lobe 806A may represent audio information from both the center channel and the second side channel. A listener may hear audio corresponding to the second response lobe 806A as having a wideness that is dependent on the relative amplitudes of (i) the center channel provided to the audio drivers 561A, 561B, 581A, 581B, 563A, 563B, 583A, and 583B and (ii) the second side channel provided to the audio drivers 581B and 583B.

The method 600 may further involve changing the fifth direction by amplifying or attenuating the center channel relative to the second side channel. In this context, providing the generated center channel to (i) the one or more first audio drivers, (ii) the one or more second audio drivers, and/or (iii) the one or more third audio drivers may include providing the amplified or attenuated center channel.

For purposes of illustration, assume that the second response lobe 806A represents playback of the center channel with a scaling factor C=2 and playback of the second side channel with a scaling factor of S=1. Changing C=2 to C=1.5 may cause second response lobe 806A to realign so that the maximum of the second response lobe is more closely aligned with the axis 803 (e.g., the maximum of the third radiation pattern 807) as shown at second response lobe 806B of FIG. 8B. The alignment of the second response lobe 806B may be more suited for a large room listening environment when compared to the alignment of the second response lobe 806A. Similarly, changing to C=2 to C=3 may cause the second response lobe 806A to realign so that the maximum of the second response lobe is more closely aligned with the axis 801 (e.g., the maximum of the first radiation pattern 802) as shown at second response lobe 806C of FIG. 8C. The alignment of the second response lobe 806C may be more suited for a small room listening environment when compared to the alignment of the second response lobe 806A.

The method 600 may further involve changing the fifth direction by amplifying or attenuating the second side channel relative to the center channel. In this context, providing the generated second side channel to the one or more third audio drivers may include providing the amplified or attenuated second side channel.

For purposes of illustration, assume that the second response lobe 806A represents playback of the center channel with a scaling factor C=2 and playback of the second side channel with a scaling factor of S=1. Changing S=1 to S=1.5 may cause second response lobe 806A to realign so that the maximum of the second response lobe is more closely aligned with the axis 803 (e.g., the maximum of the third radiation pattern 807) as shown at second response lobe 806B of FIG. 8B. The alignment of the second response lobe 806B may be more suited for a large room listening environment when compared to the alignment of the second response lobe 806A. Similarly, changing S=1 to S=0.5 may cause the second response lobe 806A to realign so that the maximum of the second response lobe is more closely aligned with the axis 801 (e.g., the maximum of the first radiation pattern 802) as shown at second response lobe 806C of FIG. 8C. The alignment of the second response lobe 806C may be more suited for a small room listening environment when compared to the alignment of the second response lobe 806A.

The method 600 may further involve (a) determining a physical orientation of the playback device at a first point in time, (b) after the first point in time, determining that the physical orientation of the playback device has changed relative to the physical orientation at the first point in time by more than a threshold amount of change, and (c) in response to determining that the physical orientation of the playback device has changed relative to the physical orientation at the first point in time by more than the threshold amount of change, (i) providing the generated first side channel to the one or more third audio drivers and (ii) providing the generated second side channel to the one or more first audio drivers.

For example, the playback device 900 may determine, via an accelerometer or a gyroscope, that at a first point in time the playback device 900 is in an "upright" orientation similar to the orientation of playback device 500 of FIG. 5A. In one instance, the upright orientation may be defined as a 0° rotation with respect to a rotational axis of symmetry (not shown) of the audio driver 511B or the audio driver 911B.

Figure 9:
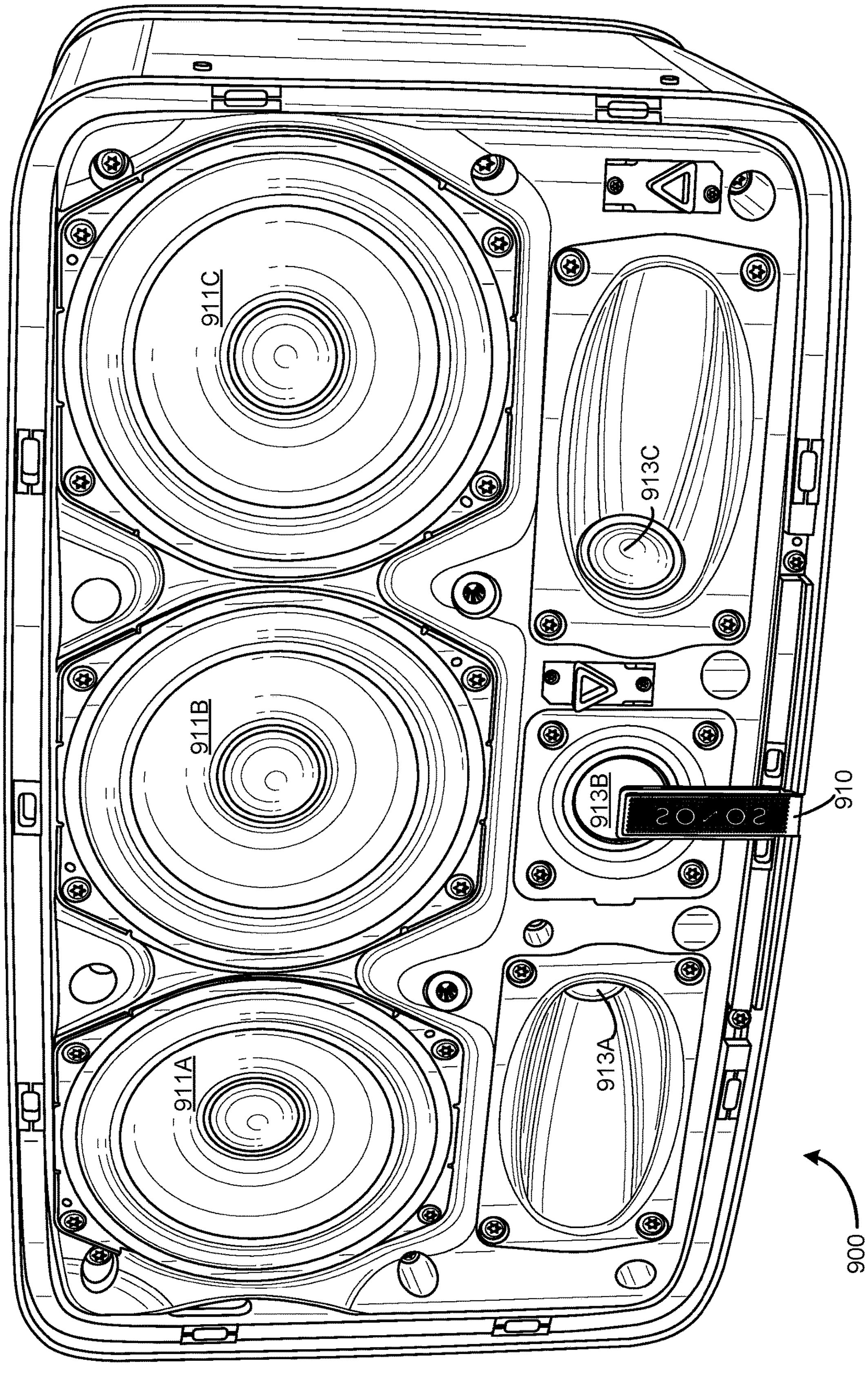
FIG. 9 shows an example playback device in an inverted orientation.

As shown in FIG. 9, after the first point in time the playback device 900 has been moved into an "inverted" orientation, which may be defined as a 180° rotation with respect to the rotational axis of symmetry of the audio driver 911B. The playback device 900 may determine that the physical orientation of the playback device 900 has changed relative to the upright orientation depicted in FIG. 5A by more than a threshold amount of change. The threshold amount of change may be 90° of rotation about the rotational axis of symmetry, but other examples are possible.

In response to determining that the physical orientation of the playback device 900 has changed relative to the upright orientation depicted in FIG. 5A by more than the threshold amount of change, the playback device 900 may operate in an "inverted" mode by providing the first side channel to the audio drivers 911A and 913A, providing the second side channel to the audio drivers 911C and 913C, and/or providing the center channel to the audio drivers 911A-C and 913A-C. In this way, the listener may perceive the same audio "image" regardless of whether the playback device is oriented as depicted in FIG. 5A or oriented as depicted in FIG. 9.

The playback devices 550 and/or 570 may similarly be configured to detect changes in their respective orientations that exceed a threshold amount of change, and to operate in an "inverted" mode in response. For example, the playback device 550 may determine that the playback device 550 has undergone a 180° rotation with respect to the orientation of playback device 550 depicted in FIG. 5B, and in response provide the first side channel to audio drivers 561B and 563B and provide the center channel to audio drivers 561A and 563A. Similarly, the the playback device 570 may determine that the playback device 570 has undergone a 180° rotation with respect to the orientation of playback device 570 depicted in FIG. 5B, and in response provide the second side channel to audio drivers 581B and 583B and provide the center channel to audio drivers 581A and 583A.

The method 600 may further involve attenuating a range of audio frequencies of the first side channel and/or the second side channel and amplifying the range of audio frequencies of the center channel. In this context, providing the generated first side channel to the one or more first audio drivers may include providing the attenuated first side channel. Providing the generated second side channel to the one or more third audio drivers may include providing the attenuated second side channel. Providing the generated center channel to (i) the one or more first audio drivers, (ii) the one or more second audio drivers, and/or (iii) the one or more third audio drivers may include providing the amplified center channel.

For example, the playback device 500 may adjust the amplitudes of the first and/or second side channels within a given audio frequency range. Due to potentially different construction and or configuration, the second audio drivers 511B and 513B may be, as a group, more efficient at generating sound waves within the given audio frequency range than the first audio drivers 511A and 513A and the third audio drivers 511C and 513C. For example, the audio drivers 511B and 513B may be less likely to reproduce distorted output at a given input amplitude corresponding to the given audio frequency range than the audio drivers 511A, 513A, 511C, and 513C.

Figure 10A:
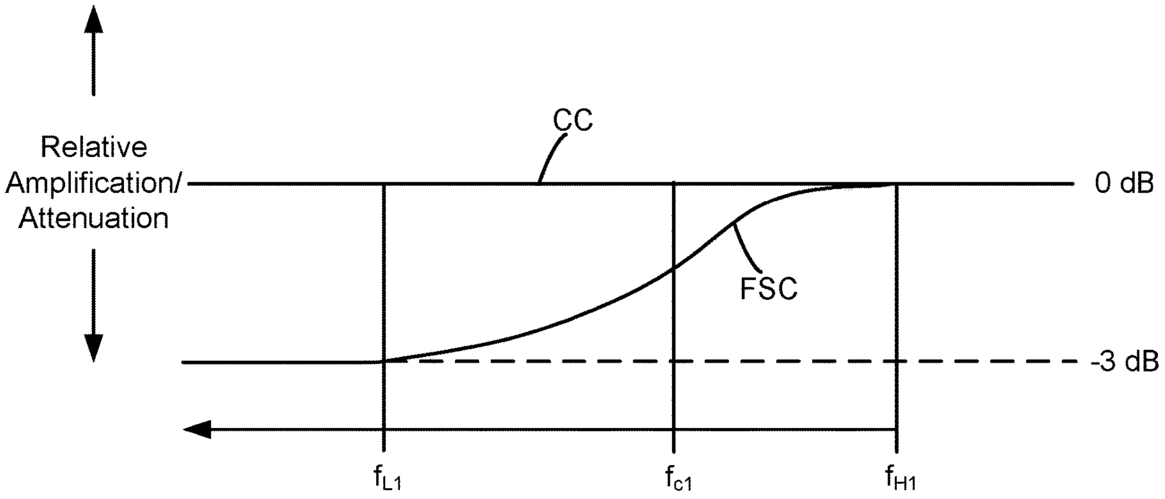
FIG. 10A shows an example attenuation curve.

For instance, the playback device 500, 550, 570, or 900 may, via an integrated low-pass filter, attenuate the first (or second) side channel (e.g., by 3 dB) with respect to the unattenuated first (or second) side channel. This is depicted by attenuation curve FSC of FIG. 10A. The attenuated range of audio frequencies may be defined at least in part by an adjustable cutoff frequency. As shown in FIG. 10A, the low-pass filter might not substantially attenuate frequencies of the first (or second) side channel that are much higher than the cutoff frequency ($f_{c1}$) of the low-pass filter (e.g., frequencies greater than $f_{H1}$). The low-pass filter may attenuate the first (or second) side channel by approximately 1.5 dB at $f_{c1}$. The low-pass filter may also attenuate frequencies of the first (or second) side channel that are much lower than $f_{c1}$ (e.g., frequencies less than $f_{L1}$) by approximately 3 dB. It should be noted that magnitudes of attenuation or amplification are presented herein for illustrative purposes only and are not intended to be limiting.

Figure 10B:
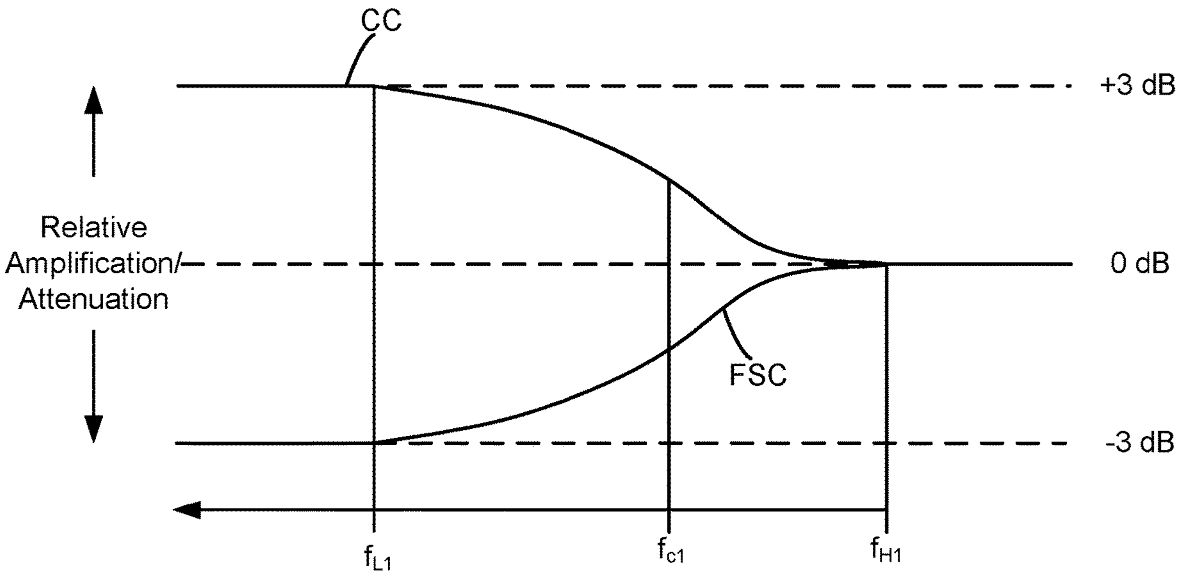
FIGS. 10B, 10C, and 10D show example attenuation and amplification curves.

By further example, the playback device 500, 550, 570, or 900 may, via an integrated amplifier, amplify the center channel (e.g., by 3 dB) with respect to the unamplified center channel. This is depicted by attenuation curve CC of FIG. 10B. As shown in FIG. 10B, the amplifier might not substantially amplify frequencies of the center channel that are much higher than the cutoff frequency ($f_{c1}$) of the amplifier (e.g., frequencies greater than $f_{H1}$). The amplifier may amplify the center channel by approximately 1.5 dB at $f_{c1}$. The amplifier may also amplify frequencies of the center channel that are much lower than $f_{c1}$ (e.g., frequencies less than $f_{L1}$) by approximately 3 dB. As a specific example, the cutoff frequency $f_{c1}$ may be 300 Hz, but other examples are possible.

The playback device 500 may then provide the frequency-dependently attenuated first side channel to the audio drivers 511A and 513A and the frequency-dependently amplified center channel to the audio drivers 511A-C and 513A-C. The playback device 500 may also provide a frequency-dependently attenuated second side channel to the audio drivers 511C and 513C in a manner similar to generating and providing the frequency-dependently attenuated first side channel to the audio drivers 511A and 513A described above.

In another example, the playback device 550 may provide the frequency-dependently attenuated first side channel to the audio drivers 561A and 563A and the frequency-dependently amplified center channel to the audio drivers 561A-B and 563A-B. The playback device 570 may provide the frequency-dependently amplified center channel to the audio drivers 581A-B and 583A-B. The playback device 570 may also provide a frequency-dependently attenuated second side channel to the audio drivers 581B and 583B in a manner similar to generating and providing the frequency-dependently attenuated first side channel described above.

In this context, the method 600 may further involve receiving a command to increase a volume at which the playback device plays the audio content and increasing the cutoff frequency in response to receiving the command to increase the volume.

Figure 10C:
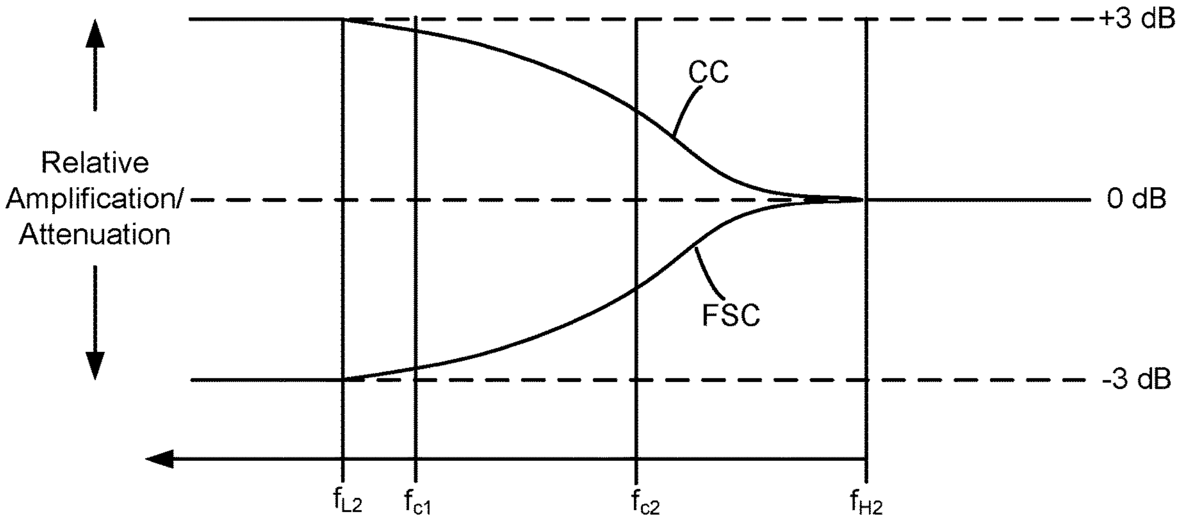

For example, the playback device may receive an "increase volume" command from the control device 300 depicted in FIG. 3. In other examples, the playback device receives the "increase volume" command via its own user input device(s) such as a button, dial, and/or touch screen. In response to receiving the "increase volume" command, the amplifier and/or the low-pass filter of the playback device may increase their respective cutoff frequencies from $f_{c1}$ to $f_{c2}$ as shown in FIG. 10C. Accordingly, the playback device might not substantially attenuate frequencies of the first (or second) side channel greater than $f_{H2}$ nor substantially amplify frequencies of the center channel greater than $f_{H2}$. The playback device may attenuate the first (or second) side channel by approximately 1.5 dB at $f_{c2}$ and amplify the center channel by approximately 1.5 dB at $f_{c2}$. The playback device may also attenuate frequencies of the first (or second) side channel that are much lower than $f_{c2}$ (e.g., frequencies less than $f_{L2}$) by approximately 3 dB and amplify frequencies of the center channel that are much lower than $f_{c2}$ (e.g., frequencies less than $f_{L2}$) by approximately 3 dB.

The method 600 may further involve receiving a command to decrease a volume at which the playback device plays the audio content and decreasing the cutoff frequency in response to receiving the command to decrease the volume.

Figure 10D:
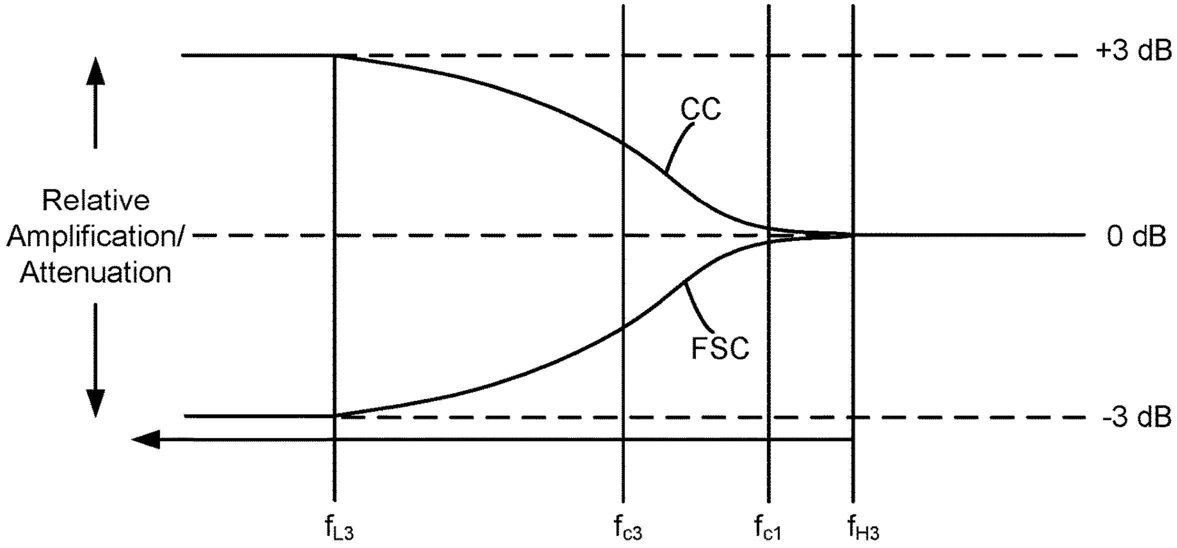

For example, the playback device may receive a "decrease volume" command from the control device 300 depicted in FIG. 3. In other examples, the playback device receives the "decrease volume" command via its own user input device(s) such as a button, dial, and/or touch screen. In response to receiving the "decrease volume" command, the amplifier and/or the low-pass filter of the playback device may decrease their respective cutoff frequencies from $f_{c1}$ to $f_{c3}$ as shown in FIG. 10D. Accordingly, the playback device might not substantially attenuate frequencies of the first (or second) side channel greater than $f_{H3}$ nor substantially amplify frequencies of the center channel greater than $f_{H3}$. The playback device may attenuate the first (or second) side channel by approximately 1.5 dB at $f_{c3}$ and amplify the center channel by approximately 1.5 dB at $f_{c3}$. The playback device may also attenuate frequencies of the first (or second) side channel that are much lower than $f_{c3}$ (e.g., frequencies less than $f_{L3}$) by approximately 3 dB and amplify frequencies of the center channel that are much lower than $f_{c3}$ (e.g., frequencies less than $f_{L3}$) by approximately 3 dB.

The method 600 may further involve determining a degree to which the left channel or the right channel exceeds a threshold amplitude within the range of audio frequencies and based on the determined degree, determining a factor by which to (i) attenuate the range of audio frequencies of the first side channel and/or the second side channel and (ii) amplify the range of audio frequencies of the center channel. In this context, attenuating the range of audio frequencies of a side channel may include attenuating the range of audio frequencies of the side channel by the determined factor. Amplifying the range of audio frequencies of the center channel may include amplifying the range of audio frequencies of the center channel by the determined factor.

Accordingly, if the playback device 500 determines that an amplitude of the left or right channel exceeds a predetermined threshold amplitude within the given frequency range, the playback device 500 may attenuate the amplitudes of the first and/or second side channels and amplify the amplitude of the center channel so as to have the audio drivers 511B and 513B handle more of the overall "load" of reproducing the audio content. In a sense, the playback device 500 may reallocate the overall audio power output reproduced by the playback device 500. In some cases, this reallocation of audio power among audio drivers may be performed at the expense of a less perceivable wideness of the audio content reproduced by the playback device 500.

For example, the playback device 500 may determine that the input amplitude of at least one portion of the left or right channel within the given frequency range (e.g., $f \le f_{c1} = 300$ Hz) exceeds the threshold amplitude by an amount such as 3 dB. In response, the playback device 500 may attenuate the first side channel and/or the second side channel by 3 dB (or another amount) and/or amplify the center channel by 3 dB (or another amount) as shown in FIG. 10B. In some examples, the first and/or second side channels may be attenuated by an amount different from the amount of amplification provided for the center channel.

Method 600 and related functionality described above may be related to instances in which audio content is provided to a playback system in a format that includes center, left, and right channels. On the other hand, the method 700 and related functionality described below may be related to instances in which audio content is provided to a playback system in a format that includes a center channel and a side channel. As such, the method 600 and related functions may be performed by a single playback device or perhaps a pair of playback devices, but other examples are possible. Generally, the method 700 is performed by a single playback device, but other examples are possible as well.

In some examples, the method 700 is performed by a playback device comprising one or more first audio drivers, one or more second audio drivers, and one or more third audio drivers, such as the playback device 500. At block 702, the method 700 includes receiving a center channel of audio content and a side channel of the audio content. For example, the playback device 500 may receive the center channel and/or the side channel in any manner described above in connection with block 602 of the method 600.

At block 704, the method 700 includes providing the center channel of the audio content to (i) the one or more first audio drivers, (ii) the one or more second audio drivers, and (iii) the one or more third audio drivers for playback of the center channel according to a first radiation pattern that has a maximum along a first direction. For example, the playback device 500 may provide the center channel to the audio drivers 511A-C and 513A-C in any manner described above in connection with block 606 of the the method 600.

At block 706, the method 700 includes providing the side channel to the one or more first audio drivers for playback of the side channel according to a second radiation pattern that has a maximum along a second direction. In this context, the first radiation pattern and the second radiation pattern combine to form a first response lobe that has a maximum along a third direction between the first and second directions. The first response lobe may represent audio information from both the center channel and the side channel. A listener may perceive audio corresponding to the first response lobe as having a wideness that is dependent on the relative amplitudes of (i) the center channel provided to the one or more first audio drivers 511A and 513A, the one or more second audio drivers 511B and 513B, and the one or more third audio drivers 511C and 513C, and (ii) the side channel provided to the one or more first audio drivers 511A and 513B. The playback device 500 may provide the side channel in any manner described above in connection with block 610 of the method 600.

At block 708, the method 700 includes generating an inverted side channel comprising an inverse of the side channel. For instance, the playback device 500 may compute or otherwise generate the inverted side channel by inverting the side channel and/or calculating additive inverses of amplitudes of the side channel. The inverted side channel may be generated in any manner described above.

At block 710, the method 700 includes providing the inverted side channel to the one or more third audio drivers for playback of the inverted side channel according to a third radiation pattern that has a maximum along a fourth direction. In this context, the first radiation pattern and the third radiation pattern may combine to form a second response lobe that has a maximum along a fifth direction between the first and fourth directions. The second response lobe may represent audio information from both the center channel and the inverted side channel. A listener may perceive audio corresponding to the second response lobe as having a wideness that is dependent on the relative amplitudes of (i) the center channel provided to the one or more first audio drivers 511A and 513A, the one or more second audio drivers 511B and 513B, and the one or more third audio drivers 511C and 513C, and (ii) the inverted side channel provided to the one or more third audio drivers 511C and 513C. The playback device 500 may provide the inverted side channel in any manner described above.

In addition, one of skill in the art will recognize that the functionality related to the method 600 described above can also be incorporated into the method 700 in a variety of ways which are contemplated herein.

IV. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. At least one non-transitory computer-readable medium comprising program instructions that are executable by at least one processor such that a first playback device is configured to:

receive data representing audio content;

receive data representing one or more characteristics of a listening environment;

generate, based on the received data representing the audio content and the received data representing the one or more characteristics of the listening environment, a plurality of audio signals that form an audio image when played back concurrently, the plurality of audio signals comprising (i) first audio having a first response lobe with a maximum along a first direction, (ii) second audio having a second response lobe with a maximum along a second direction, (iii) third audio having a third response lobe with a maximum along a third direction, (iv) fourth audio having a fourth response lobe with a maximum along a fourth direction, and (v) fifth audio having a fifth response lobe with a maximum along a fifth direction;

play back the first audio, the second audio, and the third audio via two or more first audio transducers;

cause, via a network interface, a second playback device to play back the fourth audio via one or more second audio transducers in synchrony with playback of the first audio, the second audio, and the third audio; and cause, via the network interface, a third playback device to play back the fifth audio via one or more third audio transducers in synchrony with playback of the first audio, the second audio, and the third audio.

2. The at least one non-transitory computer-readable medium of claim 1, wherein the one or more characteristics of the listening environment comprise a size of the listening environment, and wherein the program instructions that are executable by the at least one processor such that the first playback device is configured to generate the plurality of audio signals comprise program instructions that are executable by the at least one processor such that the first playback device is configured to:

generate the plurality of audio signals based on the size of the listening environment.

3. The at least one non-transitory computer-readable medium of claim 2, wherein the program instructions that are executable by the at least one processor such that the first playback device is configured to generate the plurality of audio signals based on the size of the listening environment comprise program instructions that are executable by the at least one processor such that the first playback device is configured to:

manipulate at least two of the first audio, the second audio, the third audio, the fourth audio, and the fifth audio to widen the audio image using superposition according to the size of the listening environment.

4. The at least one non-transitory computer-readable medium of claim 2, wherein the program instructions that are executable by the at least one processor such that the first playback device is configured to generate the plurality of audio signals based on the size of the listening environment comprise program instructions that are executable by the at least one processor such that the first playback device is configured to:

modify respective amplitudes of the at least two of the first audio, the second audio, the third audio, the fourth audio, and the fifth audio.

5. The at least one non-transitory computer-readable medium of claim 1, wherein the one or more characteristics of the listening environment comprise locations of walls or other sound barriers within the listening environment, and wherein the program instructions that are executable by the at least one processor such that the first playback device is configured to generate the plurality of audio signals comprise program instructions that are executable by the at least one processor such that the first playback device is configured to:

generate the plurality of audio signals based on the locations of sound barriers within the listening environment.

6. The at least one non-transitory computer-readable medium of claim 1, wherein the program instructions that are executable by the at least one processor such that the first playback device is configured to cause the second playback device to play back the fourth audio via the one or more second audio transducers comprise program instructions that are executable by the at least one processor such that the first playback device is configured to:

send, via the network interface, a digital data stream representing the fourth audio.

7. The at least one non-transitory computer-readable medium of claim 1, wherein the first playback device is integral to a television, and wherein the received data representing the audio content comprises audio content of a video.

8. A system comprising:

a first playback device comprising two or more first audio transducers;

at least one processor; and at least one non-transitory computer-readable medium comprising program instructions that are executable by the at least one processor such that the system is configured to:

receive data representing audio content;

receive data representing one or more characteristics of a listening environment;

generate, based on the received data representing the audio content and the received data representing the one or more characteristics of the listening environment, a plurality of audio signals that form an audio image when played back concurrently, the plurality of audio signals comprising (i) first audio having a first response lobe with a maximum along a first direction, (ii) second audio having a second response lobe with a maximum along a second direction, (iii) third audio having a third response lobe with a maximum along a third direction, (iv) fourth audio having a fourth response lobe with a maximum along a fourth direction, and (v) fifth audio having a fifth response lobe with a maximum along a fifth direction;

play back the first audio, the second audio, and the third audio via the two or more first audio transducers;

cause, via a network interface, a second playback device to play back the fourth audio via one or more second audio transducers in synchrony with playback of the first audio, the second audio, and the third audio; and cause, via the network interface, a third playback device to play back the fifth audio via one or more third audio transducers in synchrony with playback of the first audio, the second audio, and the third audio.

9. The system of claim 8, wherein the one or more characteristics of the listening environment comprise a size of the listening environment, and wherein the program instructions that are executable by the at least one processor such that the system is configured to generate the plurality of audio signals comprise program instructions that are executable by the at least one processor such that the system is configured to:

generate the plurality of audio signals based on the size of the listening environment.

10. The system of claim 9, wherein the program instructions that are executable by the at least one processor such that the system is configured to generate the plurality of audio signals based on the size of the listening environment comprise program instructions that are executable by the at least one processor such that the system is configured to:

manipulate at least two of the first audio, the second audio, the third audio, the fourth audio, and the fifth audio to widen the audio image using superposition according to the size of the listening environment.

11. The system of claim 9, wherein the program instructions that are executable by the at least one processor such that the system is configured to generate the plurality of audio signals based on the size of the listening environment comprise program instructions that are executable by the at least one processor such that the system is configured to:

modify respective amplitudes of the at least two of the first audio, the second audio, the third audio, the fourth audio, and the fifth audio.

12. The system of claim 8, wherein the one or more characteristics of the listening environment comprise locations of walls or other sound barriers within the listening environment, and wherein the program instructions that are executable by the at least one processor such that the system is configured to generate the plurality of audio signals comprise program instructions that are executable by the at least one processor such that the system is configured to:

generate the plurality of audio signals based on the locations of sound barriers within the listening environment.

13. The system of claim 8, wherein the program instructions that are executable by the at least one processor such that the system is configured to cause the second playback device to play back the fourth audio via the one or more second audio transducers comprise program instructions that are executable by the at least one processor such that the system is configured to:

send, via the network interface, a digital data stream representing the fourth audio.

14. The system of claim 8, wherein the first playback device is integral to a television, and wherein the received data representing the audio content comprises audio content of a video.

15. A first playback device comprising at least one processor; and at least one non-transitory computer-readable medium comprising program instructions that are executable by the at least one processor such that the first playback device is configured to:

receive data representing audio content;

receive data representing one or more characteristics of a listening environment;

generate, based on the received data representing the audio content and the received data representing the one or more characteristics of the listening environment, a plurality of audio signals that form an audio image when played back concurrently, the plurality of audio signals comprising (i) first audio having a first response lobe with a maximum along a first direction, (ii) second audio having a second response lobe with a maximum along a second direction, (iii) third audio having a third response lobe with a maximum along a third direction, (iv) fourth audio having a fourth response lobe with a maximum along a fourth direction, and (v) fifth audio having a fifth response lobe with a maximum along a fifth direction;

play back the first audio, the second audio, and the third audio via two or more first audio transducers;

cause, via a network interface, a second playback device to play back the fourth audio via one or more second audio transducers in synchrony with playback of the first audio, the second audio, and the third audio; and cause, via the network interface, a third playback device to play back the fifth audio via one or more third audio transducers in synchrony with playback of the first audio, the second audio, and the third audio.

16. The first playback device of claim 15, wherein the one or more characteristics of the listening environment comprise a size of the listening environment, and wherein the program instructions that are executable by the at least one processor such that the first playback device is configured to generate the plurality of audio signals comprise program instructions that are executable by the at least one processor such that the first playback device is configured to:

generate the plurality of audio signals based on the size of the listening environment.

17. The first playback device of claim 16, wherein the program instructions that are executable by the at least one processor such that the first playback device is configured to generate the plurality of audio signals based on the size of the listening environment comprise program instructions that are executable by the at least one processor such that the first playback device is configured to:

manipulate at least two of the first audio, the second audio, the third audio, the fourth audio, and the fifth audio to widen the audio image using superposition according to the size of the listening environment.

18. The first playback device of claim 16, wherein the program instructions that are executable by the at least one processor such that the first playback device is configured to generate the plurality of audio signals based on the size of the listening environment comprise program instructions that are executable by the at least one processor such that the first playback device is configured to:

modify respective amplitudes of the at least two of the first audio, the second audio, the third audio, the fourth audio, and the fifth audio.

19. The first playback device of claim 15, wherein the one or more characteristics of the listening environment comprise locations of walls or other sound barriers within the listening environment, and wherein the program instructions that are executable by the at least one processor such that the first playback device is configured to generate the plurality of audio signals comprise program instructions that are executable by the at least one processor such that the first playback device is configured to:

generate the plurality of audio signals based on the locations of sound barriers within the listening environment.

20. The first playback device of claim 15, wherein the program instructions that are executable by the at least one processor such that the first playback device is configured to cause the second playback device to play back the fourth audio via the one or more second audio transducers comprise program instructions that are executable by the at least one processor such that the first playback device is configured to:

send, via the network interface, a digital data stream representing the fourth audio.

* * * * *